(12) United States Patent
Malik et al.

(10) Patent No.: US 11,206,605 B2
(45) Date of Patent: Dec. 21, 2021

(54) DISCOVERY PROCEDURES FOR MULTI-BAND OPERATION

(71) Applicant: QUALCOMM Incorporated, San Diego, CA (US)

(72) Inventors: Rahul Malik, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/109,241

(22) Filed: Aug. 22, 2018

(65) Prior Publication Data

US 2019/0069228 A1 Feb. 28, 2019

Related U.S. Application Data

(60) Provisional application No. 62/550,499, filed on Aug. 25, 2017.

(51) Int. Cl.
*H04W 72/04* (2009.01)
*H04W 48/16* (2009.01)
(Continued)

(52) U.S. Cl.
CPC ............. *H04W 48/16* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS

| 2017/0135029 A1 | 5/2017 | Chendamarai et al. |
| 2018/0020479 A1* | 1/2018 | Harada ................. H04L 5/0098 |
| 2018/0249497 A1* | 8/2018 | Noh .................... H04L 27/2602 |

FOREIGN PATENT DOCUMENTS

| EP | 3197225 A1 | 7/2017 |
| WO | WO-2016121917 A1 | 8/2016 |
| WO | WO-2017097562 A1 | 6/2017 |

OTHER PUBLICATIONS

International Search Report and Written Opinion—PCT/US2018/047766—ISA/EPO—dated Oct. 17, 2018 (175594WO).

(Continued)

*Primary Examiner* — Kouroush Mohebbi
(74) *Attorney, Agent, or Firm* — Holland & Hart LLP

(57) ABSTRACT

Methods, systems, and devices for wireless communication are described. Some wireless communications systems may support multi-band operation. Different frequency bands may experience different communication characteristics (e.g., frequency-dependent fading), which may result in undesirable interference patterns and/or coverage gaps. The described techniques provide for discovery procedures for multi-band operation. The discovery procedures may allow for improved throughput, improved energy efficiency, reduced signaling overhead, as well as other benefits for a wireless communications system. Generally, the described techniques provide for efficient discovery reference signal (DRS) transmissions over multiple frequency bands. The timing of the DRS transmissions across the different bands may be related or the DRS transmission timing for each band may be determined independently.

30 Claims, 19 Drawing Sheets

(51) Int. Cl.
*H04L 5/00* (2006.01)
*H04W 24/10* (2009.01)
*H04L 5/14* (2006.01)
*H04B 7/06* (2006.01)
*H04L 27/00* (2006.01)
*H04W 24/02* (2009.01)

(52) U.S. Cl.
CPC ....... *H04W 24/10* (2013.01); *H04W 72/0453* (2013.01); *H04B 7/0617* (2013.01); *H04L 5/001* (2013.01); *H04L 5/0053* (2013.01); *H04L 5/0098* (2013.01); *H04L 5/14* (2013.01); *H04L 27/0006* (2013.01); *H04W 24/02* (2013.01)

(56) References Cited

OTHER PUBLICATIONS

Taiwan Search Report—TW107129445—TIPO—dated Sep. 20, 2021.

\* cited by examiner

DISCOVERY PROCEDURES FOR MULTI-BAND OPERATION

CROSS REFERENCES

The present Application for patent claims the benefit of U.S. Provisional Patent Application No. 62/550,499 by MALIK et al., entitled "Discovery Procedures For Multi-Band Operation," filed Aug. 25, 2017, assigned to the assignee hereof, and expressly incorporated herein.

BACKGROUND

The following relates generally to wireless communication, and more specifically to discovery procedures for multi-band operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In wireless communications systems supporting communications over multiple frequency bands, higher frequencies may generally experience larger degrees of signal attenuation. For example, millimeter wave (mmW) communications may experience substantially lower coverage in non-line-of-sight (NLOS) channels (e.g., compared to sub-6 GHz communications). Additionally, mmW deployments may provide sparser coverage (e.g., larger or more regular coverage gaps) than low-band deployments. In some cases, unlicensed mmW communications may be associated with stricter effective isotropic radiated power (EIRP) regulations than licensed or shared spectrum communications. For example, the 60 GHz unlicensed band may limit transmission power to 40 dBm per device while the 37 GHz shared band may allow transmission powers up to 75 dBm per 100 MHz per device. Additionally or alternatively, maximum permissible exposure (MPE) restrictions may limit the achievable data rate and/or communication coverage at certain high-band (e.g., mmW) frequencies (e.g., for both unlicensed and licensed channels).

Power consumption in mmW devices may be dominated by the radio frequency (RF) components, which may dissipate power due to lower efficiencies associated with operation at higher frequencies. Additionally, stand-alone cellular design approaches may be ineffective for mmW deployments (e.g., due to the low achievable inter-site distances (ISDs) which may create signal interference for communications over frequencies that experience lower degrees of signal attenuation). Therefore, while communications over higher frequency bands may experience benefits (e.g., greater bandwidth), such benefits may in some cases be offset by the resource cost. Improved techniques that support multi-band operation may be desired.

SUMMARY

The described techniques relate to improved methods, systems, devices, or apparatuses that support discovery procedures for multi-band operation. Generally, the described techniques provide for discovery reference signals (DRSs) to be transmitted on multiple frequency bands. DRS may be used to efficiently convey relevant cell information. For example, DRS may facilitate fast transition of a small cell from an OFF state to an ON state (e.g., by transmitting low duty cycle signals for radio resource management (RRM) measurement during the OFF state). During the OFF period, DRS (e.g., which may include synchronization signals, reference signals, and or system information) may be transmitted (e.g., to allow UEs to discover and measure the dormant cell). For example, DRS may be transmitted within a periodically occurring time window (e.g., which may be referred to as a DRS measurement timing configuration (DMTC) window). Various DMTC window formats are considered within the scope of the present disclosure. For example, the DMTC window may have a configurable (e.g., or fixed) duration and periodicity. Various discovery procedures are considered. In accordance with the described techniques, one or more DRS transmissions of a high-band may be anchored to a DRS transmission on a low-band. Additionally or alternatively, the high-band DRS transmission(s) may be based on a timing reference that is independent of the low-band DRS (e.g., where the low-band DRS may be subject to listen-before-talk (LBT) procedures of a shared channel). Such techniques may reduce DRS latency, reduce signaling overhead, reduce power consumption, or otherwise benefit a wireless communications system.

A method of wireless communication is described. The method may include receiving, via a first radio, a configuration for a DMTC window for a first cell associated with a first frequency band, identifying a DRS timing offset for a second cell associated with a second frequency band, the second frequency band comprising higher frequencies than the first frequency band, and monitoring, via a second radio, for a second DRS associated with the second cell based at least in part on the DRS measurement timing window for the first cell and the DRS timing offset for the second cell.

An apparatus for wireless communication is described. The apparatus may include means for receiving, via a first radio, a configuration for a DMTC window for a first cell associated with a first frequency band, means for identifying a DRS timing offset for a second cell associated with a second frequency band, the second frequency band comprising higher frequencies than the first frequency band, and means for monitoring, via a second radio, for a second DRS associated with the second cell based at least in part on the DRS measurement timing window for the first cell and the DRS timing offset for the second cell.

Another apparatus for wireless communication is described. The apparatus may include a processor, memory in electronic communication with the processor, and instructions stored in the memory. The instructions may be operable to cause the processor to receive, via a first radio, a configuration for a DMTC window for a first cell associated with a first frequency band, identify a DRS timing offset for a second cell associated with a second frequency band, the second frequency band comprising higher frequencies than the first frequency band, and monitor, via a second radio, for a second DRS associated with the second cell based at least in part on the DRS measurement timing window for the first cell and the DRS timing offset for the second cell.

A non-transitory computer readable medium for wireless communication is described. The non-transitory computer-readable medium may include instructions operable to cause a processor to receive, via a first radio, a configuration for a DMTC window for a first cell associated with a first frequency band, identify a DRS timing offset for a second cell associated with a second frequency band, the second frequency band comprising higher frequencies than the first frequency band, and monitor, via a second radio, for a second DRS associated with the second cell based at least in part on the DRS measurement timing window for the first cell and the DRS timing offset for the second cell.

Some examples of the method, apparatus, and non-transitory computer-readable medium described herein may further include processes, features, means, or instructions for receiving, via the first radio, a first DRS associated with the first cell within the DRS measurement timing window, wherein the DRS timing offset for the second cell may be referenced to the first DRS.

In some examples of the method, apparatus, and non-transitory computer-readable medium described herein, the first DRS comprises an indication of an availability of one or more candidate cells operating in the second frequency band.

Some examples of the method, apparatus, and non-transitory computer-readable medium described herein may further include processes, features, means, or instructions for determining a location of the UE based at least in part on a reference signal received via the first radio, wherein the monitoring for the second DRS may be based at least in part on the determined location.

In some examples of the method, apparatus, and non-transitory computer-readable medium described herein, the DRS timing offset for the second cell may be determined based on a reference subframe of the DRS measurement timing window.

Some examples of the method, apparatus, and non-transitory computer-readable medium described herein may further include processes, features, means, or instructions for identifying a second DRS timing offset for a third cell operating in the second frequency band. Some examples of the method, apparatus, and non-transitory computer-readable medium described herein may further include processes, features, means, or instructions for monitoring, via the second radio, for a third DRS associated with the third cell based at least in part on the DRS measurement timing window for the first cell and the second DRS timing offset for the third cell.

In some examples of the method, apparatus, and non-transitory computer-readable medium described herein, the third cell and the second cell operate in a same shared channel of the second frequency band.

In some examples of the method, apparatus, and non-transitory computer-readable medium described herein, the second cell operates over a first channel of the second frequency band and the third cell operates over a second channel of the second frequency band.

In some examples of the method, apparatus, and non-transitory computer-readable medium described herein, the second cell and the third cell may be associated with a same base station.

In some examples of the method, apparatus, and non-transitory computer-readable medium described herein, the second cell may be associated with a base station and the third cell may be associated with a different base station.

In some examples of the method, apparatus, and non-transitory computer-readable medium described herein, the first cell and the second cell may be associated with respective antenna arrays of a same base station.

In some examples of the method, apparatus, and non-transitory computer-readable medium described herein, the first cell may be associated with a first base station and the second cell may be associated with a different base station.

Some examples of the method, apparatus, and non-transitory computer-readable medium described herein may further include processes, features, means, or instructions for activating the second radio based on the configuration for the DRS measurement timing window, wherein the second radio may be associated with communication via the second frequency band.

In some examples of the method, apparatus, and non-transitory computer-readable medium described herein, the second cell may be identified from a list of candidate cells, the list of candidate cells received via the first radio.

In some examples of the method, apparatus, and non-transitory computer-readable medium described herein, the second DRS comprises a beam identifier, a cell identifier corresponding to the second cell, or both.

Some examples of the method, apparatus, and non-transitory computer-readable medium described herein may further include processes, features, means, or instructions for reporting the cell identifier to a base station associated with the first cell. Some examples of the method, apparatus, and non-transitory computer-readable medium described herein may further include processes, features, means, or instructions for associating with the second cell based at least in part on the beam identifier.

In some examples of the method, apparatus, and non-transitory computer-readable medium described herein, the first frequency band may be associated with a first path loss and the second frequency band may be associated with a second path loss greater than the first path loss.

A method of wireless communication is described. The method may include identifying a configuration for a DMTC window for a first cell associated with a first frequency band, identifying a DRS timing offset for a second cell associated with a second frequency band, the second frequency band comprising higher frequencies than the first frequency band, and transmitting a second DRS associated with the second cell based at least in part on the DRS measurement timing window for the first cell and the DRS timing offset for the second cell.

An apparatus for wireless communication is described. The apparatus may include means for identifying a configuration for a DMTC for a first cell associated with a first frequency band, means for identifying a DRS timing offset for a second cell associated with a second frequency band, the second frequency band comprising higher frequencies than the first frequency band, and means for transmitting a second DRS associated with the second cell based at least in part on the DRS measurement timing window for the first cell and the DRS timing offset for the second cell.

Another apparatus for wireless communication is described. The apparatus may include a processor, memory in electronic communication with the processor, and instructions stored in the memory. The instructions may be operable to cause the processor to identify a configuration for a DMTC window for a first cell associated with a first frequency band, identify a DRS timing offset for a second cell associated with a second frequency band, the second frequency band comprising higher frequencies than the first frequency band, and transmit a second DRS associated with the second cell based at least in part on the DRS measurement timing window for the first cell and the DRS timing offset for the second cell.

A non-transitory computer readable medium for wireless communication is described. The non-transitory computer-readable medium may include instructions operable to cause a processor to identify a configuration for a discovery reference signal (DRS) measurement timing window for a first cell associated with a first frequency band, identify a DRS timing offset for a second cell associated with a second frequency band, the second frequency band comprising higher frequencies than the first frequency band, and transmit a second DRS associated with the second cell based at least in part on the DRS measurement timing window for the first cell and the DRS timing offset for the second cell.

Some examples of the method, apparatus, and non-transitory computer-readable medium described herein may further include processes, features, means, or instructions for detecting a transmission of a first DRS associated with the first cell within the DRS measurement timing window, wherein the second DRS may be transmitted based at least in part on the detected first DRS.

Some examples of the method, apparatus, and non-transitory computer-readable medium described herein may further include processes, features, means, or instructions for detecting the transmission of the first DRS comprises transmitting the first DRS.

In some examples of the method, apparatus, and non-transitory computer-readable medium described herein, the first DRS comprises a timing reference for the DRS timing offset, an indication of an availability of one or more candidate cells operating in the second frequency band, or both.

Some examples of the method, apparatus, and non-transitory computer-readable medium described herein may further include processes, features, means, or instructions for determining an availability of a first frequency channel of the first frequency band based at least in part on a first channel access procedure, wherein the first DRS may be transmitted based at least in part on the first channel access procedure.

In some examples of the method, apparatus, and non-transitory computer-readable medium described herein, the first cell may be associated with a base station and the second cell may be associated with a different base station.

In some examples of the method, apparatus, and non-transitory computer-readable medium described herein, the second DRS comprises a beam identifier, a cell identifier corresponding to the second cell, or both.

DETAILED DESCRIPTION

Support of communication over multiple frequency bands may provide benefits in coverage or throughput for a wireless communications system. Different frequency bands may exhibit different communication characteristics. For example, transmissions on higher frequencies may generally experience larger path loss. Such frequency-dependent characteristics may lead to communications over the higher frequency bands being supported over a smaller coverage range than otherwise similar communications (e.g., communications associated with similar transmission powers) over the lower frequency bands. Such limitations may in some cases be ameliorated through the use of beamforming techniques, whereby signals are transmitted such that they constructively interfere at a receiving device. However, beamforming may be resource intensive (e.g., such that it may drain energy from power-limited devices, may generate signaling overhead that reduces system throughput, etc.) and may not be useful for all types of communication. Accordingly, the described techniques provide for a framework of operation for efficient high band (e.g., mmW) communications.

Aspects of the disclosure are initially described in the context of a wireless communications system. Aspects of the disclosure are then described with reference to a device diagram, example transmission schemes, and process flows. Aspects of the disclosure are further illustrated by and described with reference to apparatus diagrams, system diagrams, and flowcharts that relate to discovery procedures for multi-band operation.

Figure 1:
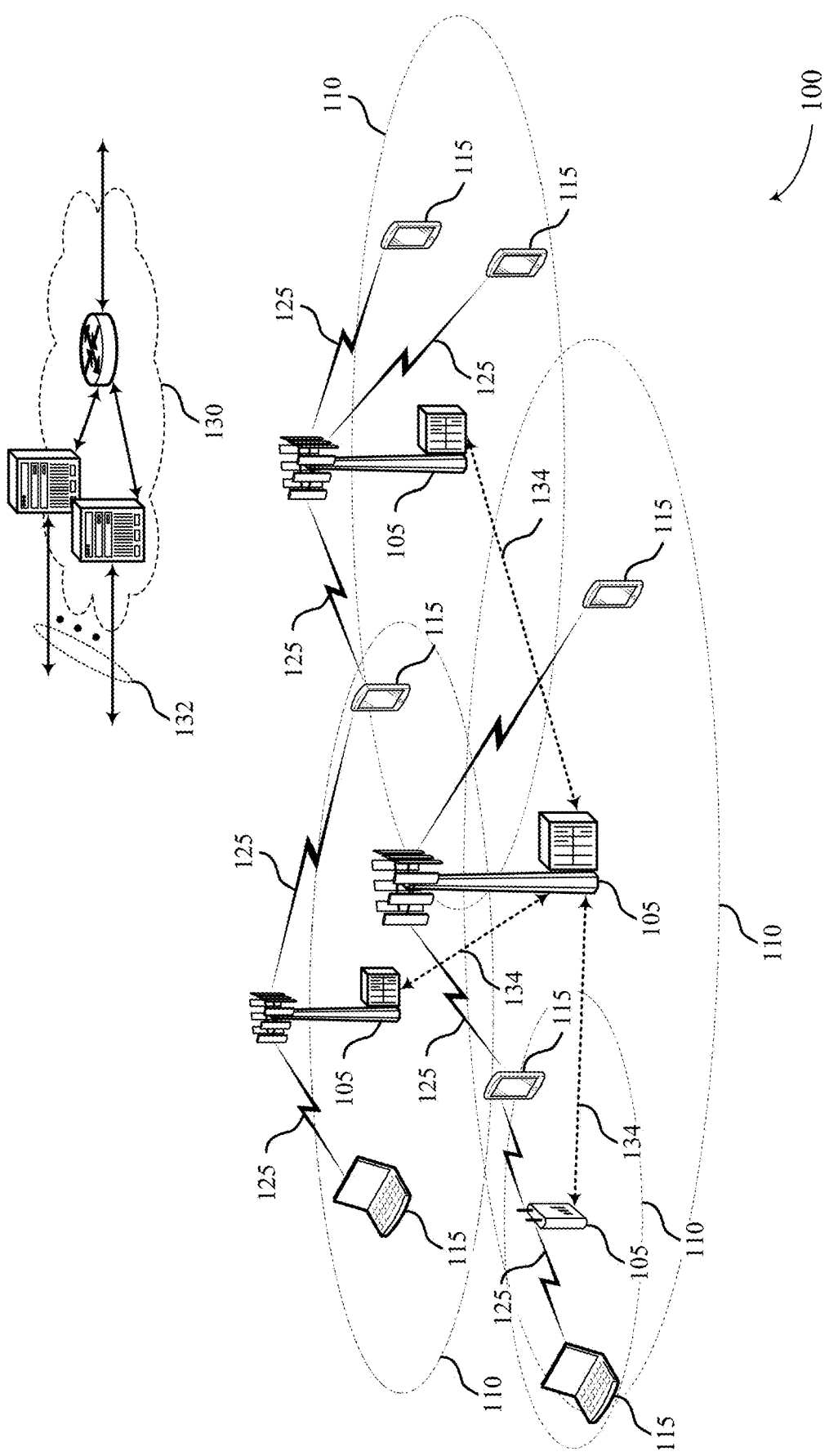
FIG. 1 illustrates an example of a system for wireless communication that supports discovery procedures for multi-band operation in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

A base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID) or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, an augmented reality/virtual reality (AR/VR) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated may be determined based at least in in part on signals transmitted in different beam directions. For example, a UE 115 may receive one or more reference signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or for transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "receive beamforming" according to different receive beams or receive directions. In some examples a receiving device may use a single receive beam to receive along a single beam direction (e.g., when receiving a data signal). The single receive beam may be aligned in a beam direction determined based at least in part on receive beamforming according to different receive beam directions (e.g., a beam direction determined to have a highest signal strength, highest signal-to-noise ratio, or otherwise acceptable signal quality based at least in part on receive beamforming according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator are allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
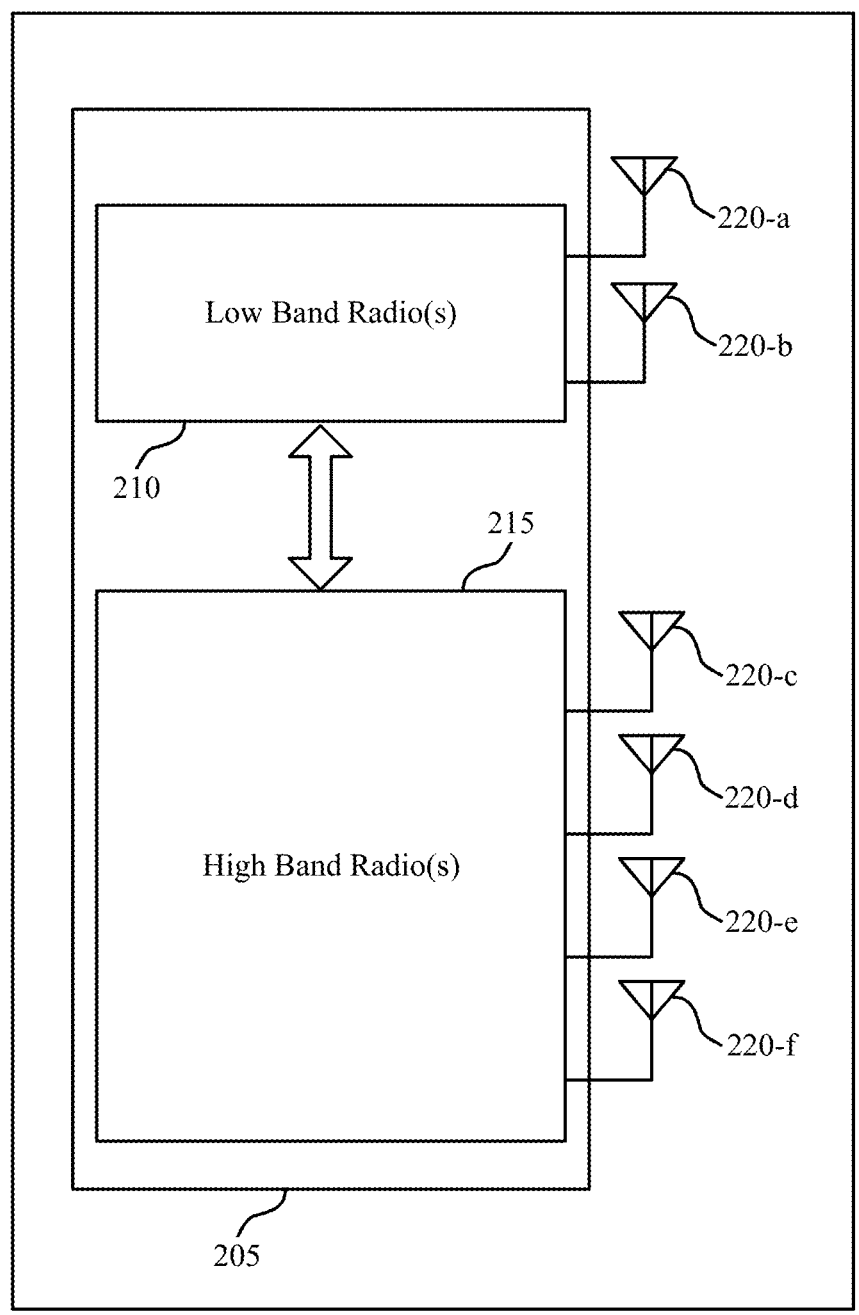
FIG. 2 illustrates an example of a device that supports discovery procedures for multi-band operation in accordance with aspects of the present disclosure.

FIG. 2 illustrates an example of a wireless device 200 that supports channel access mechanisms for multi-band operation in accordance with various aspects of the present disclosure. In some examples, wireless device 200 may implement aspects of wireless communication system 100. For example, wireless device 200 may be an example of a base station 105 or a UE 115 as described with reference to FIG. 1. In some cases, wireless device 200 may be an example of a network entity (e.g., a coordinating entity).

Wireless device 200 includes one or more low-band radios 210 and one or more high-band radios 215, which may be components of a wireless communications manager 205 (e.g., which may be an example of or implement aspects of a communications manager as described further below). For example, a given low-band radio 210 may support sub 6 GHz communications while a given high-band radio 215 may support communications in a higher frequency band such as above 6 GHz or between 30 GHz and 300 GHz (e.g., mmW communications). Various techniques for providing internal synchronization between the low-band radio(s) 210 and the high-band radio(s) 215 are considered. As discussed above, high-band radio 215 communicate over smaller path distances (e.g., especially in NLOS environments) than low-band radio 210. However, spectrum resources may be more plentiful at frequencies used by high-band radio 215. In addition, using a higher density pattern of base stations 105 for communication over higher frequencies such as mmW increases frequency reuse and thus increases capacity. Because of such coverage differences, a high density arrangement of base stations 105 suited for mmW communication may not be suited for efficient use of the low-band frequency resources. That is, because of the lower degrees of signal attenuation associated with low-band communications and small ISDs (e.g., to reduce coverage gaps for high-band communications), some wireless devices 200 may communicate using only high-band radio(s) 215 (e.g., and may suspend communications over low-band radio(s) 210). For example, the low-band radio 210 may be used to initially establish a connection, and then communications may be transitioned to high-band radio 215 once the high-band communication link is established. Alternatively, the low-band radio may continue to be used for data and control communications, or only control communications (RRC configuration, uplink control information, etc.). Such deployments may reduce interference over the low-band or otherwise benefit a wireless communications system. In some cases, a given transmission deployment (e.g., in which certain wireless devices 200 suspend communications over a low-band radio 210) may be a result of a configuration (e.g., during deployment) or may be a result of self-organizing network (SON) functionality.

In accordance with the described techniques, a wireless device 200 may use the low-band radio 210 (e.g., which may be associated with wider coverage) for synchronizing timing with other neighboring wireless devices 200 (e.g., may transmit DRSs on the low-band). In some cases, the DRS includes a primary synchronization signal (PSS), a secondary synchronization signal (SSS) and may include a physical broadcast control channel (PBCH). In some cases, each radio may be associated with one or more antennas 220. For example, an antenna 220 may refer to a given collection of antenna elements in an antenna array. In this example, low-band radio 210 supports communications over antennas 220-a, 220-b (e.g., which may be located in a first antenna array associated with a first antenna spacing) while high-band radio 215 supports communications over antennas 220-c, 220-d, 220-e, 220-f (e.g., which may be associated with a second antenna spacing). In some examples, high-band radio(s) 215 may be associated with multiple antenna panels (e.g., which each may include multiple antennas and corresponding phase control circuits). As described further below, some wireless devices 200 may support multiple carriers over low-band radio 210 and/or high-band radio 215 (e.g., to allow for carrier aggregation and/or dual connectivity).

Figure 3:
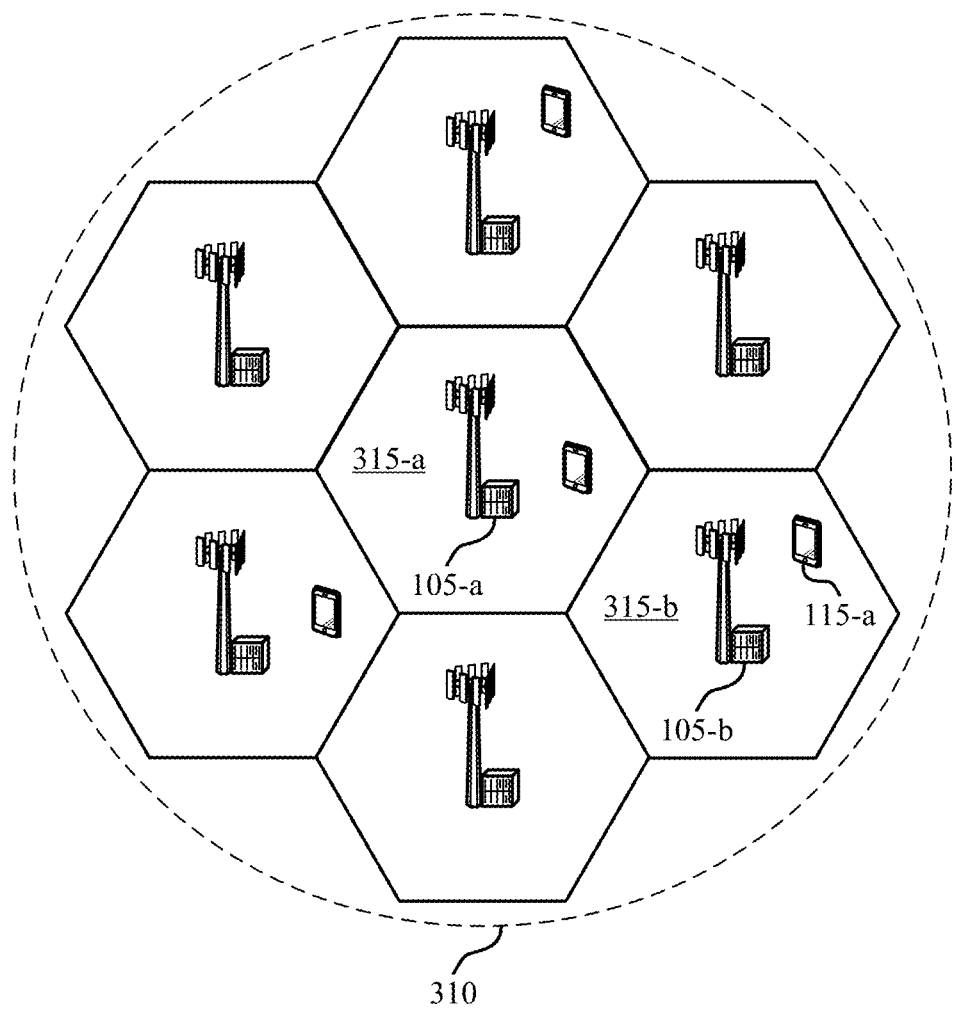
FIG. 3 illustrates an example of a network configuration that supports discovery procedures for multi-band operation in accordance with aspects of the present disclosure.

FIG. 3 illustrates an example of a network configuration 300 that supports channel access mechanisms for multi-band operation in accordance with various aspects of the present disclosure. In some examples, network configuration 300 may implement aspects of wireless communication system 100. Network configuration 300 may in some cases be based on SON functionality. For example, base station 105-a (e.g., which may be an example of any of the corresponding devices above) may be an example of an anchor device that provides low-band communications for a low-band coverage area 310. Each base station 105 within low-band coverage area 310 may be a serving base station for a cell that provides coverage for a respective high-band coverage area 315.

As described herein, coverage constraints on the high-band communications (e.g., relative to the low-band communications) results in a topology with multiple high-band base stations 105 (e.g., base stations 105 in which communications over a low-band radio are suspended) in the low-band coverage area 310 of an anchor base station (e.g., base station 105-a). It is to be understood that network configuration 300 is included for the sake of illustration, such that the deployment of the base stations 105 may not fit a regular pattern (e.g., which may in some cases result in coverage gaps in high-band coverage areas 315).

In accordance with the described techniques, cells of base stations 105 may be synchronized (e.g., have synchronized frame timing). Base stations 105 may synchronize using backhaul signaling (e.g., in cases where deterministic or ideal backhaul is present), or the base stations 105 may utilize their respective low-band radios to achieve over-the-air (OTA) synchronization (e.g., based on DRS transmissions from base station 105-a). By way of example, base station 105-b may be an example of a high-band base station 105 (e.g., a multi-band-capable base station operable to support communications over a high-band within coverage area 315-b). Base station 105-b may transmit downlink data to UE 115-a over the high-band, while base station 105-a may communicate with UE 115-a over the low-band. For example, base station 105-a may communicate control information (e.g., ACK/NACK, downlink control information, etc.) with UE 115-a over the low-band.

In some cases, concurrent communication over channels in different frequency bands may be supported for UEs 115 (e.g., using different radios associated with the same base station 105 or with different base stations 105). For example, the low-band (e.g., which all base stations 105 may be operable to support) may enable the combination of multiple carriers (e.g., which may be referred to as CA or dual connectivity). Similarly, high-band operation may be supported by some or all devices (e.g., base stations and UEs). For example, a given UE 115 may support a single mmW channel at a time. That is, the operator may configure some UEs on a licensed high-band and some UEs on a shared spectrum high-band. Additionally or alternatively, a UE 115 may simultaneously support multiple high-band channels (e.g., with a single RF module). For example, such a design may involve synchronization between the high-band channels and result in higher complexity/power requirements for communicating devices.

Aspects of the following are described in the context of a UE 115 that supports a single high-band communication link at a time (e.g., in addition to one or more low-band communication links). In these examples, different operators may have independent timing on their low-band and high-band communications. For example, mmW operators using shared spectrum may have a common timing (e.g., across operators). The mmW shared spectrum model may be realized using a TDD approach (e.g., in which a common TDD configuration is employed across operators who pool their shared spectrum for higher trunking efficiency). Such a model may in some cases employ a LBT-based approach (e.g., a one shot LBT) with operators pooling resources together. Various discovery procedures are described in detail below.

Figure 4:
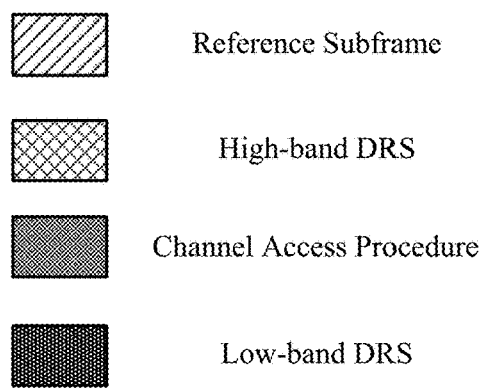
FIGS. 4 and 5 illustrate example transmission schemes that support discovery procedures for multi-band operation in accordance with aspects of the present disclosure.
Figure 4:
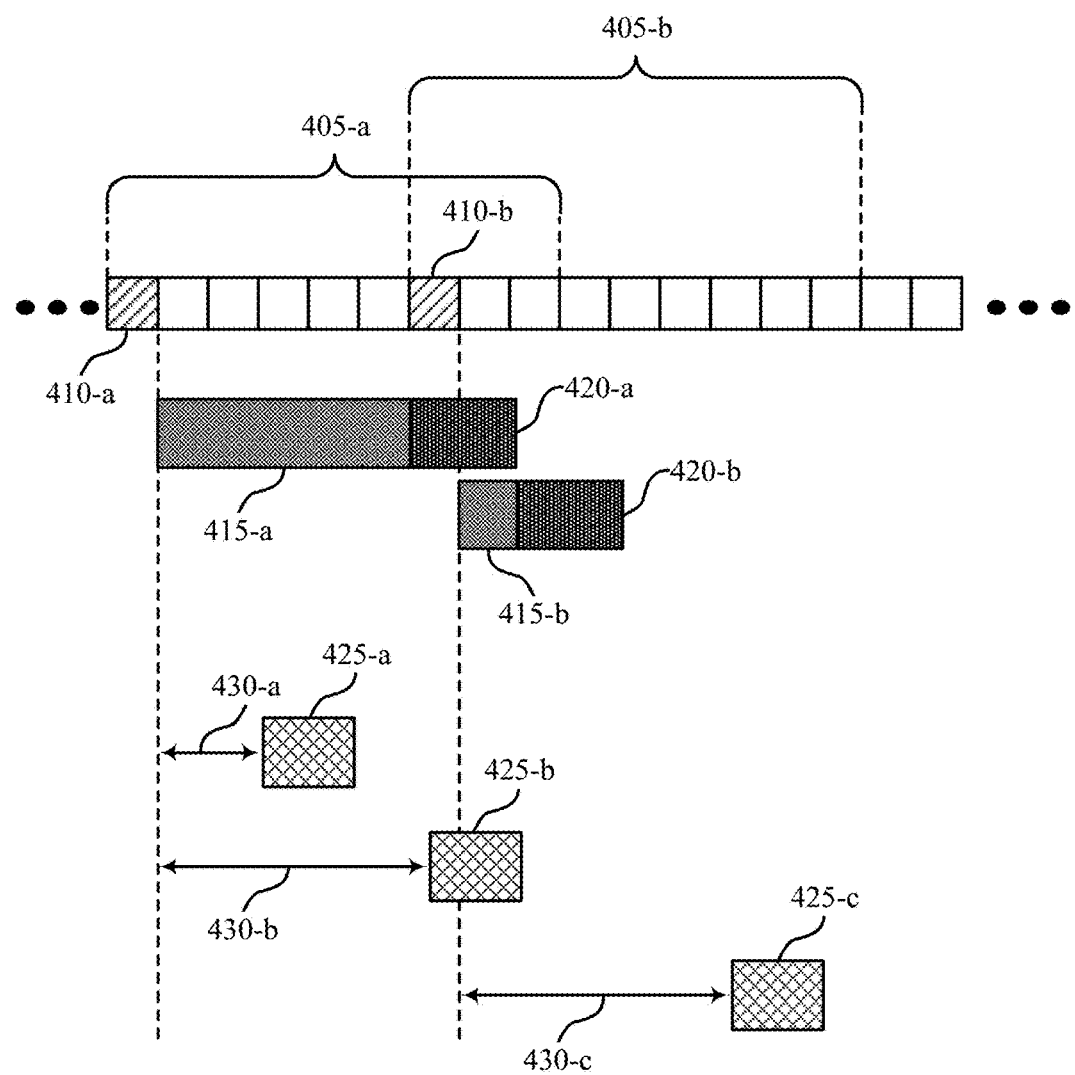

FIG. 4 illustrates an example of a transmission scheme 400 that supports discovery procedures for multi-band operation in accordance with various aspects of the present disclosure. In some examples, transmission scheme 400 may implement aspects of wireless communication system 100. Transmission scheme 400 may illustrate, for example, communications for a UE 115-a that is configured for communications over a low-band channel and a high-band channel (e.g., in a carrier aggregation-like or dual-connectivity configuration). For example, transmission scheme 400 may be performed in the context of network configuration 300 as described with reference to FIG. 3.

As discussed above, energy efficiency is an important parameter for optimization for some wireless devices (e.g., UEs 115). As further described herein, some high-band (e.g., mmW) communications may experience sparse coverage (e.g., which may lead to prolonged cell searches) or may otherwise consume energy (e.g., because of the low efficiency associated with RF components at higher frequencies). Accordingly, DRS may be transmitted over both low-band and high-band cells. As described herein, DRS may facilitate cell discovery and may include a PSS and/or SSS for detection and timing synchronization, and may include a PBCH. For example, DRS may indicate (e.g., via PSS or SSS) or may include (e.g., via PBCH) a cell identifier for a cell associated with the DRS, beam information, an identification of candidate cells in the area (e.g., candidate high-band cells), a timing reference, system information (e.g., a physical broadcast control channel (PBCH)), etc. (e.g., in addition to or instead of other reference signals and synchronization signals). Efficient DRS procedures may therefore improve access for mobile devices (e.g., and may therefore improve system throughput, reduce power consumption, etc.).

As described herein, a DRS may be associated with a particular cell, which may refer to a logical entity used to communicate with a base station 105 over a given carrier. A carrier (e.g., which may be associated with one or more base stations or operators) may in turn support one or more cells. A single base station may support communication over multiple carriers and may support multiple cells (e.g., over different carriers). For example, each cell associated with a given base station may be configured differently (e.g., one cell may be associated with low-band communications while another cell may be associated with high-band communications). Other techniques for categorizing cells may be employed. For example, one cell may be associated with higher throughput communications while another cell may prioritize energy efficiency.

In the example illustrated by transmission scheme 400, a first DMTC window 405-a may be configured for a first cell of a first base station (e.g., a given duration and periodicity may be specified). A second DMTC window 405-b may be configured for a second cell (e.g., which may be associated with the first base station or with a different base station). Each DMTC window 405 may span multiple subframes 410 (e.g., wherein a respective reference subframe 410-a, 410-b may in some cases be a first subframe of the respective DMTC window). In some cases, a given DMTC window 405 (e.g., a duration or periodicity of the DMTC window 405, etc.) may be based at least in part on a frequency band over which the given cell operates. That is, in some cases the DMTC window 405 may depend on the subcarrier spacing for a given cell. For example, smaller subcarrier spacing may result in longer symbol periods and a correspondingly longer DMTC window 405.

In some examples, a first cell of a first base station may operate over a first channel of the low-band frequency spectrum. The first base station may attempt to transmit a low-band DRS 420-a of the first cell via the first channel. For example, low-band DRS 420-a may enable network discovery, convey a timing reference (e.g., an offset between the transmitted DRS 420-a and the reference subframe 410-a), convey system information and capabilities, provide an indication of the availability of high-band cells in the vicinity, etc. In some cases, the indication of the availability of high-band cells is included in a PBCH of the low-band DRS 420-a. In some examples, low-band DRS 420-a may facilitate power-saving (e.g., may enable a high-band radio at a receiving device to operate in a power save mode). A UE 115 may be configured to monitor resources of DMTC window 405-a for low-band DRS 420-a. A transmitting base station may perform channel access procedure 415-a and may transmit low-band DRS 420-a upon sensing an idle medium. For example, the base station may be an example of an anchor base station (e.g., base station 105-a as described with reference to network configuration 300) and the low-band DRS may propagate across low-band coverage area 310.

In aspects of the present example, the receiving UE 115 (e.g., UE 115-a of FIG. 3) may identify a DRS offset 430 for one or more other cells operating in a high-band based on the configuration of DMTC window 405-a. For example, the UE 115 may identify DRS offset 430-a relative to reference subframe 410-a and monitor resources of a high-band channel for high-band DRS 425-a (e.g., which may be associated with a given cell operating over the high-band channel). In some cases, the UE 115 may additionally identify a second DRS offset 430-b relative to the reference subframe 410-a and monitor for high-band DRS 425-b (e.g., which may be associated with another cell operating over the high-band channel). In some cases, the cell associated with the low-band and the two high-band cells in the present example may be associated with the same base station or with different base stations. The high-band cells may each be associated with corresponding DMTC windows that are given by their corresponding DRS offsets 525-a, 525-c. In some cases, the high-band DMTC windows are of the same length as the anchor cell DMTC window 405-a. Alternatively, the length of the DMTC windows may depend on the subcarrier spacing of the low-band and high-band, as discussed above. Thus, monitoring UEs 115 may enable their high-band radios at the start of the corresponding DMTC windows to receive the high-band DRS 425. If DRS 425-a (which may be subject to LBT) is not detected within the corresponding DMTC window, a monitoring UE 115 can disable its high-band radio (unless other high-band DMTC windows are still open).

By way of example, the UE 115 (e.g., UE 115-a) may receive low-band DRS 420-a from an anchor base station 105 (e.g., base station 105-a) based on a DMTC window format. Low-band DRS 420-a may be an example of an omni-directional transmission or may be directed to a particular region of the low-band coverage area 310. For example, low-band DRS 420-a may include an indication of candidate high-band cells within low-band coverage area 310 for UE 115-a. Additionally or alternatively, UE 115-a may receive a high-band DRS 425 (e.g., independently of low-band DRS 420-a). For example, high-band DRS 425-a may be received from base station 105-b (e.g., may be associated with a first cell of base station 105-b) while high-band DRS 425-b may be received from base station 105-b (e.g., may be associated with a second cell of base station 105-b) or may be received from a second base station 105 (e.g., a neighboring base station 105).

Similarly, a base station 105 (e.g., another anchor base station) may perform channel access procedure 415-b within DMTC window 405-b. Because the channel may in some cases be occupied (e.g., by low-band DRS 420-a), the base station 105 may wait to transmit low-band DRS 420-b, which may include analogous content to low-band DRS 420-a. Additionally, a UE 115 may identify a DRS offset 430-c for a high-band DRS based at least in part on a configuration of DMTC window 405-b and may monitor for high-band DRS 425-c based on a reference subframe 410-b. In some cases, the low-band DRS 420-b may include an indication (e.g., in a PBCH of the DRS) of the reference subframe 410-b of the DMTC window 405-b. For example, system information may include a parameter that indicates a number of subframes between the reference subframe 410-b and the start of the DRS. Accordingly, while the transmissions in transmission scheme 400 may be staggered vertically, the respective low-band and high-band transmissions may in some cases be within the same channel (e.g., a shared channel). Thus, in some cases a high-band DRS 425 may be transmitted independently of a low-band DRS 420 (e.g., because the DRS offset 430 of each DRS transmission may be referenced to a reference subframe 410 rather than another transmission). Such a decoupling may enable more frequent high-band DRS 425 transmissions, which may in some cases benefit a wireless communications system. That is, because the low-band channel access procedure may clear relatively infrequently, decoupling the high-band DRS 425 from the low-band DRS 420 may improve system performance by allowing high-band DRS 425 to be transmitted more frequently.

In some cases, the UE 115 (e.g., UE 115-a) may operate in an energy-efficient mode between high-band DRS searches. That is, UE 115-a may in some cases power down (e.g., or off) a high-band radio as described herein with reference to FIG. 2. UE 115-a may then activate the high-band radio based on one or more communication conditions. For example, UE 115-a may monitor for high-band DRS 425 transmissions based on signaling received over its low-band radio (e.g., which may indicate a location of UE 115-a or the existence of neighboring high-band cells). Because UE 115-a is in some cases configured with a set of candidate cells (e.g., during RRC setup or during some subsequent semi-static signaling period), UE 115-a may determine that it is in the vicinity of a high-band cell associated with a peripheral base station 105 (e.g., base station 105-b) and search for the DRS of the high-band cell based at least in part on a DMTC window for the low-band. That is, UE 115-a may derive coarse high-band timing based at least in part on signaling received over its low-band radio such that it may in some cases determine a high-band DMTC window from the low-band DRS 420-a or a reference subframe 410-a of a DMTC window 405. In some cases, the low-band DRS 420-a may include an indication (e.g., in a PBCH of the DRS) of the reference subframe 410-a of the DMTC window 405. UE 115-a may, in some cases, efficiently re-associate with a new cell (e.g., a cell associated with base station 105-b). For example, UE 115-b may indicate a cell identifier associated with a new cell of base station 105-b, and may indicate beam selection information associated with the high-band communication link with the new cell of base station 105-b. In some cases, UE 115-a indicates the cell selection information (e.g., cell identifier and/or beam information) over its low-band radio to a central base station such as base station 105-a, which may then activate base station 105-b to communicate with UE 115-a. The cell selection information may be indicated via lower layer (e.g., layer-1 or layer-2) signaling such as uplink control information. Such techniques may reduce overhead and/or latency associated with cell search procedures in which additional signaling between base station 105 and UE 115 is employed.

Figure 5:
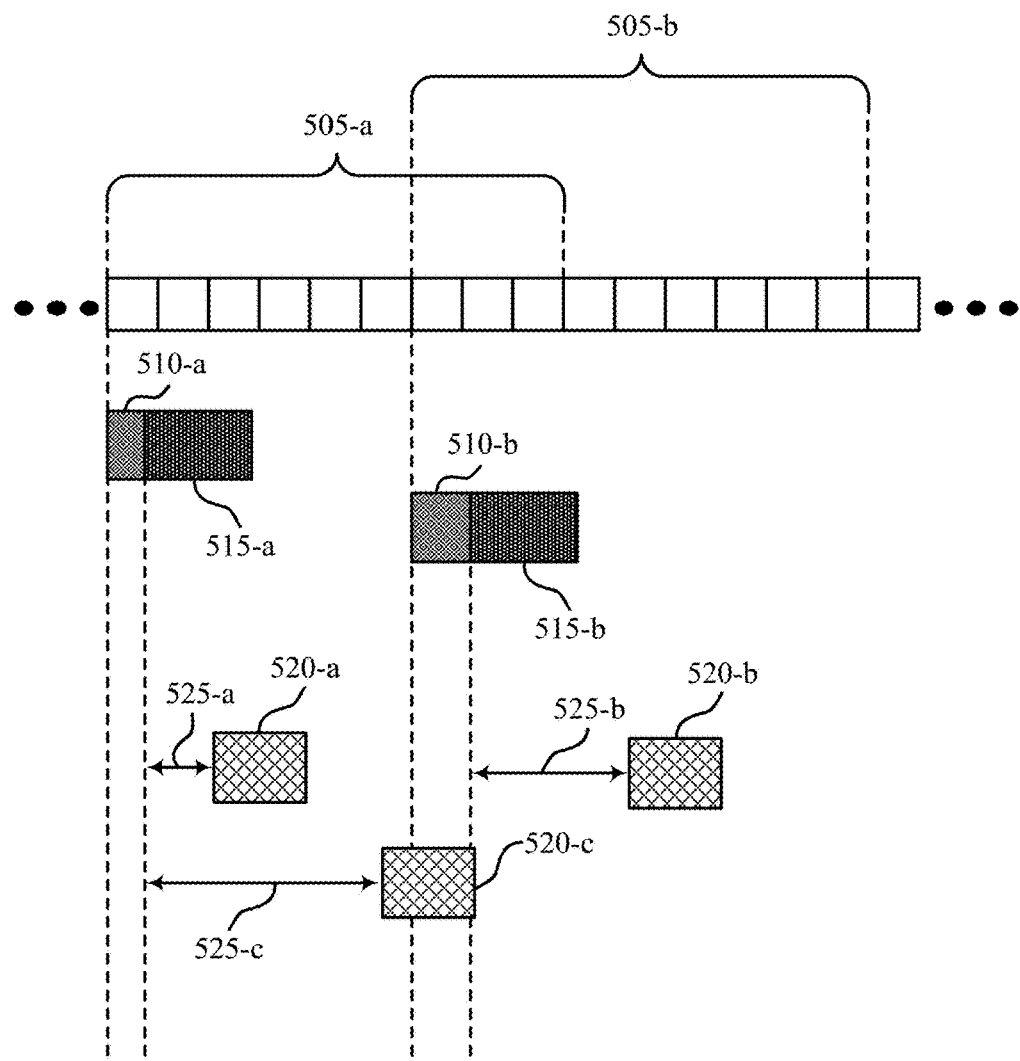

FIG. 5 illustrates an example of a transmission scheme 500 that supports discovery procedures for multi-band operation in accordance with various aspects of the present disclosure. In some examples, transmission scheme 500 may implement aspects of wireless communication system 100. Transmission scheme 500 may illustrate, for example, communications for a UE 115-a that is configured for communications over a low-band channel and a high-band channel (e.g., in a carrier aggregation-like or dual-connectivity configuration). As described with reference to transmission scheme 400, DRS may be transmitted across multiple bands in accordance with techniques described herein.

In transmission scheme 500, high-band DRS 520 transmissions may be anchored to low-band DRS 515 transmissions. In some such examples, because the timing of the high-band DRS may be indicated or derived from a given low-band DRS 515, the UE 115 DRS search on the high-band may be limited to the synchronization error between the low-band and the high-band (e.g., which may be a few microseconds). Such a constraint on the search timing may reduce UE power consumption or otherwise benefit communications. For example, such a deployment may enable the ability to support a wideband DRS to avoid power spectral density (PSD) limitations (e.g., for the high band). Additionally or alternatively, anchoring high-band transmissions to the low-band may in some cases reduce the need for intra-frequency and/or inter-frequency high-band cell measurements.

A first low-band cell of a first base station (e.g., an anchor base station) may have a first DMTC window 505-a configured for DRS signals 515. The first low-band cell may operate on a low-band channel (e.g., a shared low-band channel). Accordingly, the first base station may perform channel access procedure 510-a on the low-band channel and transmit low-band DRS 515-a upon detecting an idle medium within DMTC window 505-a configured for the low-band cell. A UE 115 receiving low-band DRS 515-a may be operable (e.g., configurable) to monitor resources of a high-band channel for a given high-band DRS 520. For example, the UE 115 may identify respective DRS offsets 525-a, 525-c and monitor resources of the high-band channel for high-band DRS 520-a associated with a first high-band cell and DRS 520-c associated with a second high-band cell. The DRS offsets 525-a, 525-c may be configured to allow monitoring UEs 115 to enable their high-band radios after detecting low-band DRS 515-a to receive the high-band DRS 525 (e.g., the offsets may be long enough to account for enabling of the high-band radios).

In some examples, the first and second high-band cells may each have an associated DMTC window that begins upon detection of the DRS 515 for the anchor cell. That is, for the first high-band cell, the corresponding anchored DMTC window begins upon detection of DRS 515-a on the low-band channel, and extends for the period associated with the DMTC window 505-*a*. Thus, if DRS 520-*a* (which may be subject to LBT) for the first high-band cell is not detected within the corresponding DMTC window, a monitoring UE 115 can disable its high-band radio (unless other high-band DMTC windows are still open). Each high-band DRS 520 may be associated with a given cell, which may in turn be associated with the same base station as low-band DRS 515-*a* or with a different base station. Similarly, a second low-band cell of another base station (a second anchor base station) may have a second DMTC window 505-*b* configured for DRS signals 515. The second DMTC window 505-*b* may or may not overlap with the first DMTC window 505-*a*. The first base station may perform channel access procedure 510-*b* on the shared low-band channel and transmit low-band DRS 515-*b* upon detecting an idle medium within the second DMTC window 505-*b*. A UE 115 receiving low-band DRS 515-*b* may identify DRS offset 525-*b* and monitor resources of the high-band carrier for high-band DRS 520-*b*.

Figure 6:
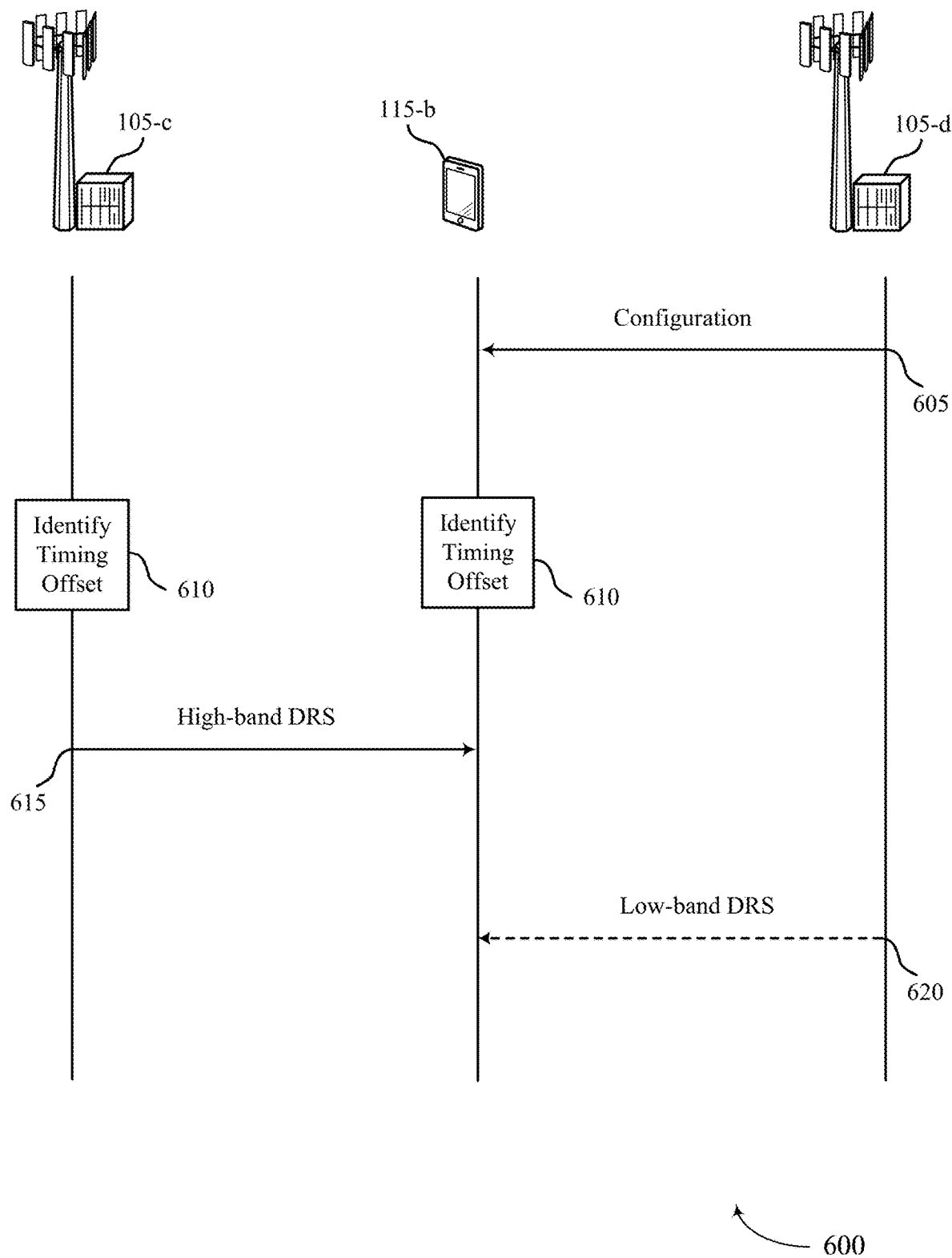
FIGS. 6 and 7 illustrate example process flows that support discovery procedures for multi-band operation in accordance with aspects of the present disclosure.

FIG. 6 illustrates an example of a process flow 600 that supports discovery procedures for multi-band operation in accordance with various aspects of the present disclosure. In some examples, process flow 600 may implement aspects of wireless communication system 100. Process flow 600 includes UE 115-*b* and base stations 105-*c*, 105-*d*, each of which may be an example of the corresponding devices described herein.

At 605, base station 105-*d* may transmit a configuration for a DMTC window for a first cell operating in a first low-band channel. For example, the configuration may be contained in control signaling transmitted over a low-band radio. In some cases, the configuration may be received by UE 115-*b* (e.g., and base station 105-*c*). That is, base station 105-*d* may be an example of a central base station (e.g., base station 105-*a* as described with reference to FIG. 3) while base station 105-*c* may be an example of a peripheral base station (e.g., base station 105-*b* as described with reference to FIG. 3). Accordingly, base station 105-*c* and UE 115-*b* may in some cases receive the configuration over a respective low-band radio, and may prepare for high-band communications accordingly.

At 610, UE 115-*b* (e.g., and base station 105-*c*) may identify a timing offset for a second cell associated with high-band operation (e.g., operating in a shared high-band channel). For example, the timing offset may be referenced to a resource of the DMTC window (e.g., a subframe as described with reference to FIG. 4).

At 615, UE 115-*b* may monitor (e.g., via a high-band radio) for a high-band DRS associated with a high-band cell of base station 105-*c*. In some cases, base station 105-*d* may additionally transmit a low-band DRS at 620. In the present example, as with transmission scheme 400, the high-band DRS may be decoupled from the low-band DRS (e.g., such that a high-band DRS may be transmitted even in cases in which a low-band DRS is not).

Figure 7:
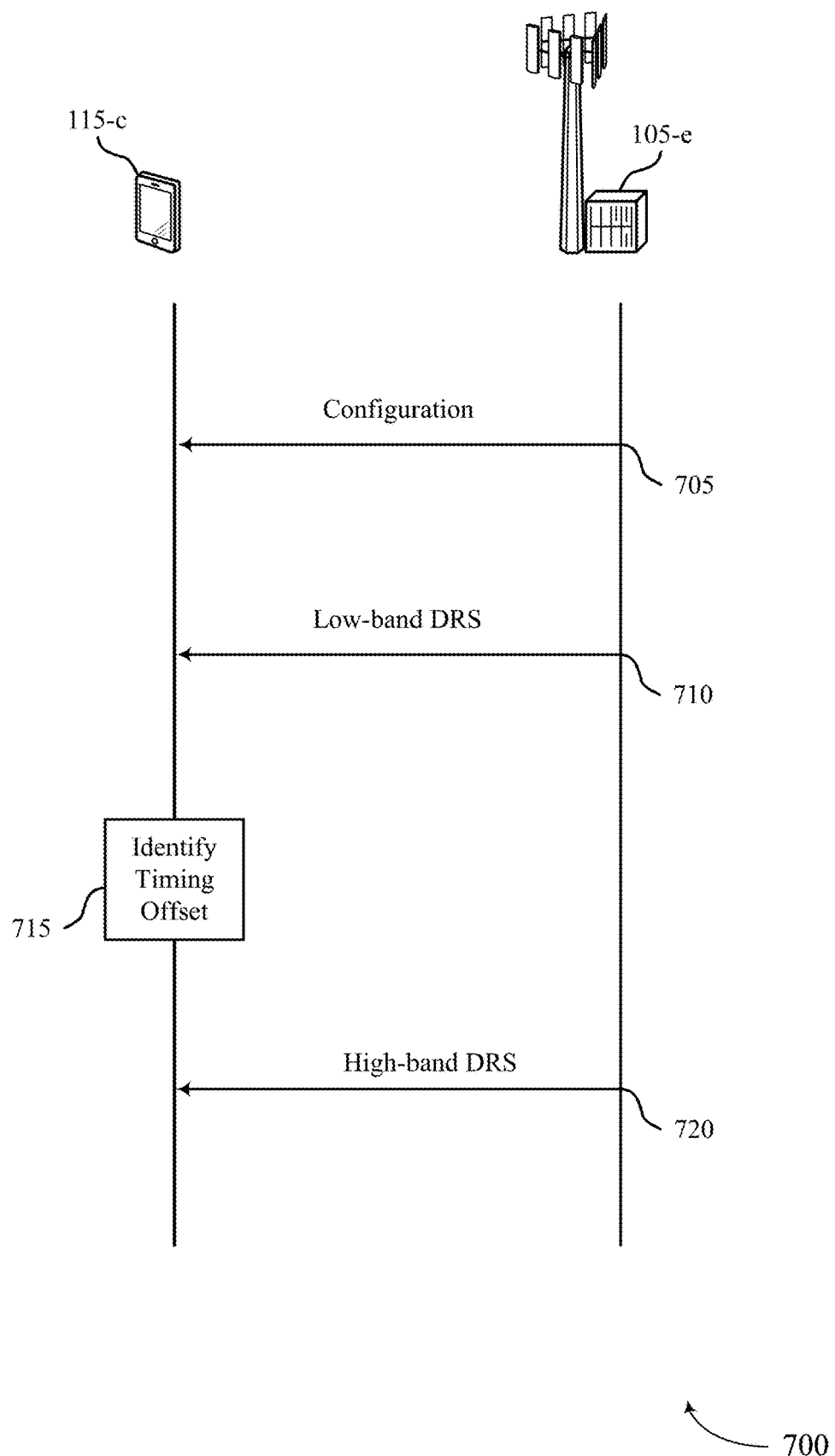

FIG. 7 illustrates an example of a process flow 700 that supports discovery procedures for multi-band operation in accordance with various aspects of the present disclosure. In some examples, process flow 700 may implement aspects of wireless communication system 100. Process flow 700 includes UE 115-*c* and base station 105-*e*, each of which may be an example of the corresponding device described herein.

At 705, base station 105-*e* may transmit a configuration for a DMTC window to UE 115-*c* (e.g., over a low-band radio, as described with reference to 605). At 710, base station 105-*e* may transmit (e.g., and UE 115-*c* may receive) the low-band DRS. As described herein, the low-band DRS may in some cases contain an indication of an availability of one or more candidate high-band cells.

At 715, UE 115-*c* may identify a timing offset between the low-band DRS and resources of a high-band channel. Accordingly, UE 115-*c* may monitor the high-band channel resources to detect high-band DRS at 720. The high-band DRS may be associated with a high-band cell and may include a beam index corresponding to a transmit beam of the base station 105-*e*, a cell ID corresponding to the high-band cell, or both.

Figure 8:
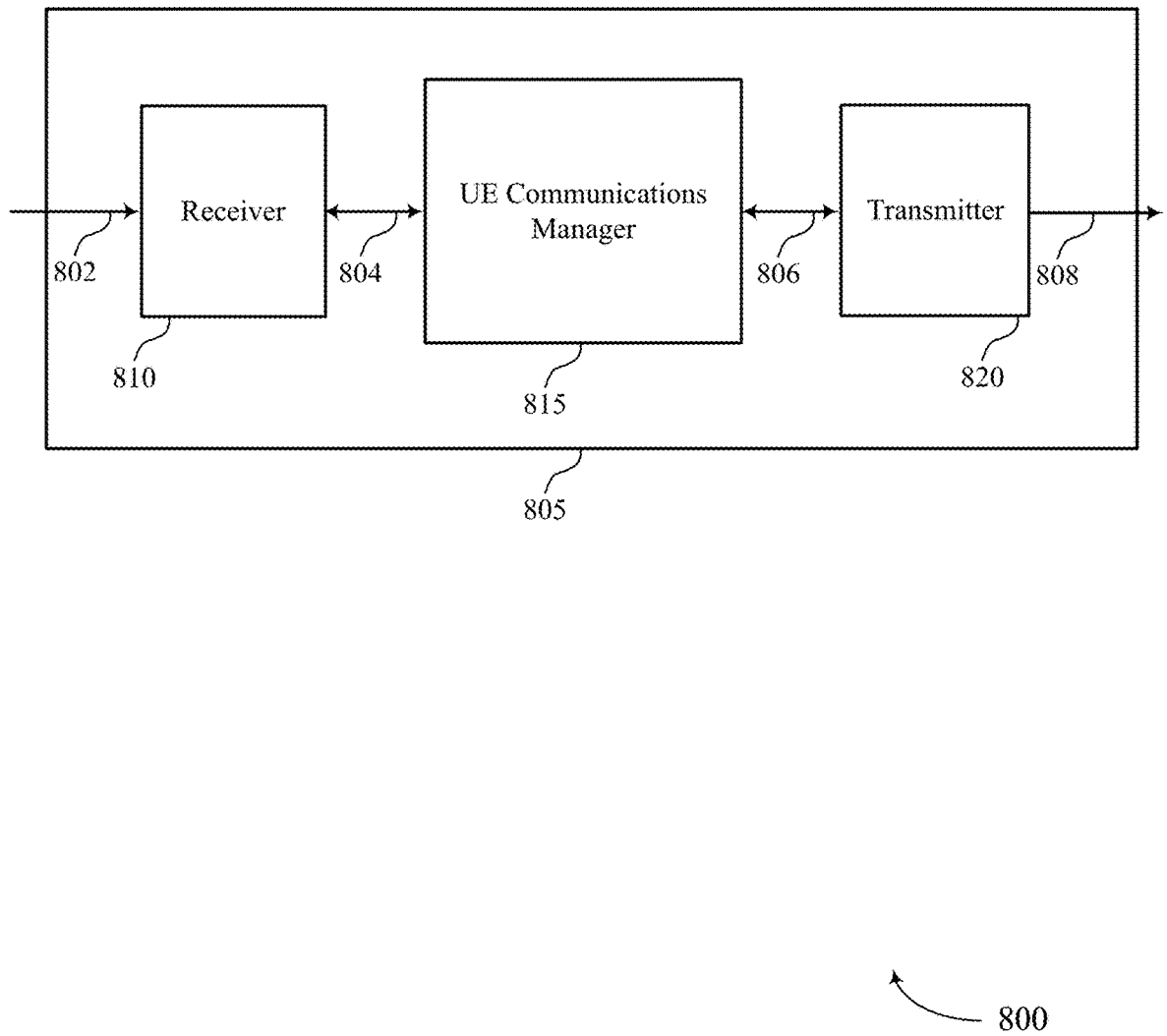
FIGS. 8 through 10 show block diagrams of a device that supports discovery procedures for multi-band operation in accordance with aspects of the present disclosure.

FIG. 8 shows a block diagram 800 of a wireless device 805 that supports discovery procedures for multi-band operation in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive signals 802 including information such as packets, user data, or control information associated with various information channels (e.g., control channels, data channels, and information related to discovery procedures for multi-band operation, etc.). Information may be passed on to other components of the device, such as the UE communications manager 815. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive, via a first radio and the receiver 810, a configuration 804 for a DRS measurement timing window for a first cell associated with a first frequency band. UE communications manager 815 may identify a DRS offset for a second cell associated with a second frequency band, the second frequency band including higher frequencies than the first frequency band. UE communications manager 815 may monitor, via a second radio, for a second DRS associated with the second cell based on the DRS measurement timing window for the first cell and the DRS offset for the second cell. UE communications manager 815 may transmit information 806 to the transmitter 820 for transmission to a base station. For example, the information 806 includes cell identifiers.

Transmitter 820 may transmit signals 808 generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas. In some cases, the signals 808 include the information 806 received from the UE communications manager 815, such as the cell identifiers.

Figure 9:
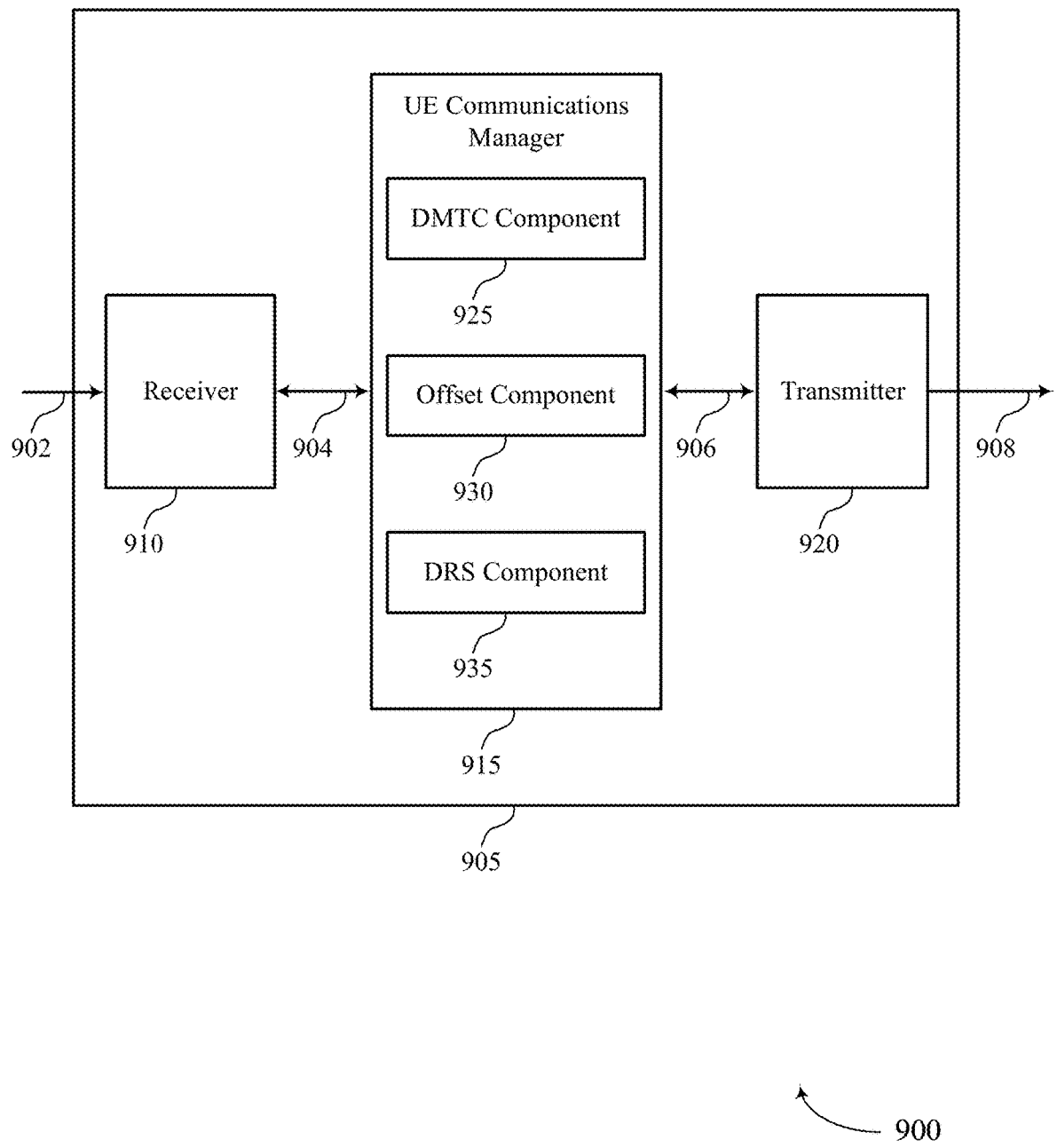

FIG. 9 shows a block diagram 900 of a wireless device 905 that supports discovery procedures for multi-band operation in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive signals 902 including information such as packets, user data, or control information associated with various information channels (e.g., control channels, data channels, and information related to discovery procedures for multi-band operation, etc.). Information 904 may be passed on to other components of the device, such as the UE communications manager 915. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include DMTC component 925, offset component 930, and DRS component 935. DMTC component 925 may receive, via a first radio, a configuration for a DRS measurement timing window for a first cell associated with a first frequency band. The configuration for the DRS measurement timing window may be received from the receiver 910.

Offset component 930 may identify a DRS offset for a second cell associated with a second frequency band, the second frequency band including higher frequencies than the first frequency band. Offset component 930 may identify a second DRS offset for a third cell operating in the second frequency band.

DRS component 935 may monitor, via a second radio, for a second DRS associated with the second cell based on the DRS measurement timing window for the first cell and the DRS offset for the second cell. DRS component 935 may monitor, via the second radio, for a third DRS associated with the third cell based on the DRS measurement timing window for the first cell and the second DRS offset for the third cell. DRS component 935 may receive, via the first radio, a first DRS associated with the first cell within the DRS measurement timing window, where the monitoring for the second DRS is based on the received first DRS. DRS component 935 may monitor, via the first radio, for a first DRS associated with the first cell based on the configuration for the DRS measurement timing window.

In some cases, the second DRS includes a beam identifier, a cell identifier corresponding to the second cell, or both. In some cases, the first DRS includes an indication of an availability of one or more candidate cells operating in the second frequency band. In some cases, the third cell and the second cell operate in a same shared channel of the second frequency band. In some cases, the second cell operates over a first channel of the second frequency band and the third cell operates over a second channel of the second frequency band. In some cases, the second cell and the third cell are associated with a same base station. In some cases, the first DRS includes a timing reference for the DRS measurement timing window, an indication of an availability of one or more candidate cells operating in the second frequency band, or both. In some cases, the first cell and the second cell are associated with respective antenna arrays of a same base station. In some cases, the first cell is associated with a first base station and the second cell is associated with a different base station. In some cases, the second cell is identified from a list of candidate cells, the list of candidate cells received via the first radio. In some cases, the second cell is associated with a base station and the third cell is associated with a different base station. UE communications manager 915 may transmit information 906 to the transmitter 920 for transmission to a base station. In some cases, the information 906 includes cell identifiers.

Transmitter 920 may transmit signals 908 generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas. In some cases, the signals 908 include the information 906 received from the UE communications manager 915, such as the cell identifiers.

Figure 10:
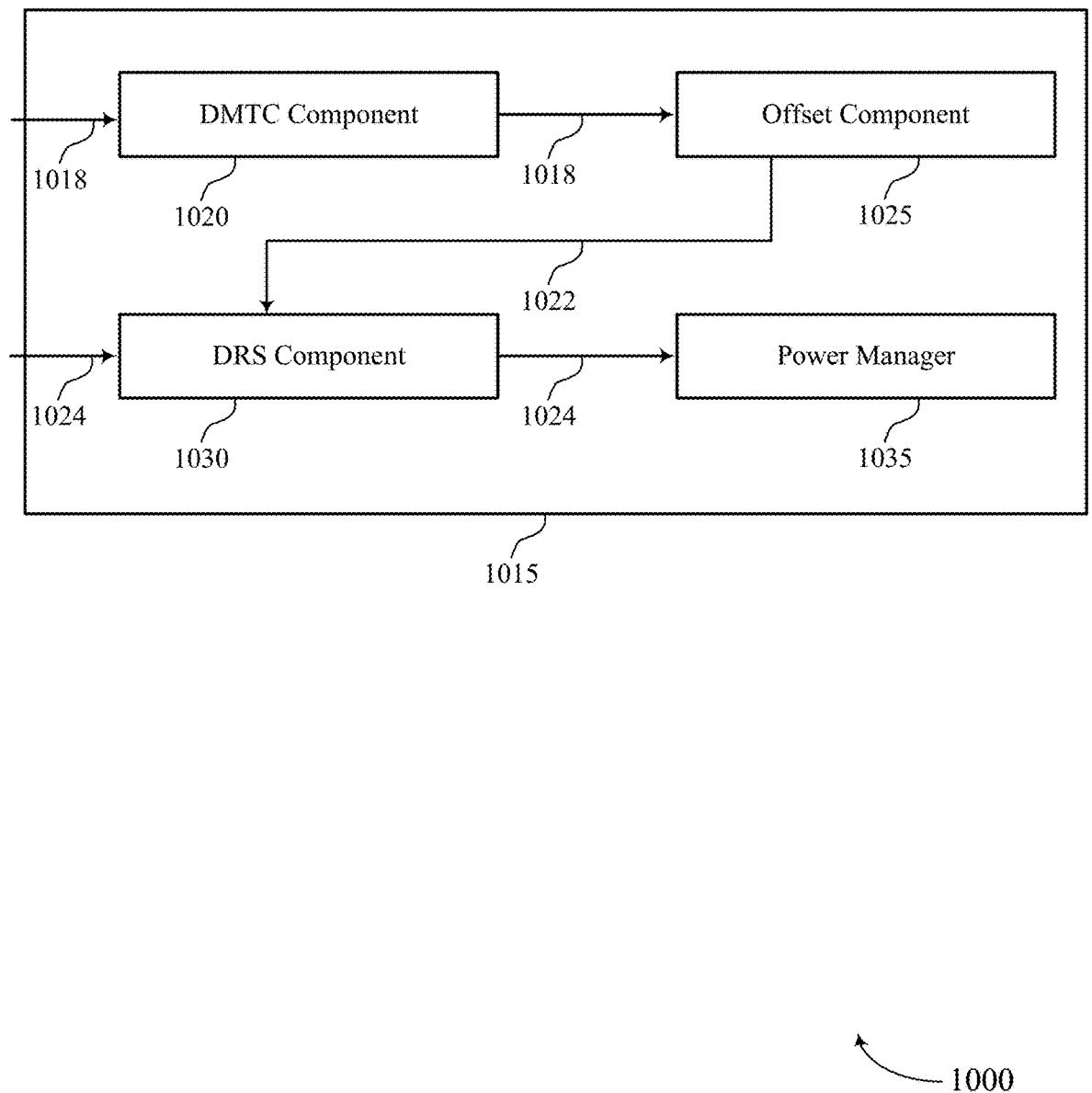

FIG. 10 shows a block diagram 1000 of a UE communications manager 1015 that supports discovery procedures for multi-band operation in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include DMTC component 1020, offset component 1025, DRS component 1030, and power manager 1035. Each of these modules may communicate, directly or indirectly, with one another (e.g., via one or more buses).

DMTC component 1020 may receive, via a first radio, a configuration 1018 for a DRS measurement timing window for a first cell associated with a first frequency band. DMTC component 1020 may forward the configuration 1018 for the DRS measurement timing window for the first cell to Offset component 1025. Offset component 1025 may identify a DRS offset 1022 for a second cell associated with a second frequency band based on the DRS measurement timing window of the first cell, the second frequency band including higher frequencies than the first frequency band. Offset component 1025 may further identify a second DRS offset for a third cell operating in the second frequency band.

DRS component 1030 may monitor, via a second radio, for a second DRS associated with the second cell based on the DRS measurement timing window for the first cell and the DRS offset 1022 for the second cell received from the offset component 1025. DRS component 1030 may monitor, via the second radio, for a third DRS associated with the third cell based on the DRS measurement timing window for the first cell and the second DRS offset for the third cell.

DRS component 1030 may monitor, via the first radio, for a first DRS 1024 associated with the first cell based on the configuration for the DRS measurement timing window. DRS component 1030 may receive, via the first radio, the first DRS 1024 associated with the first cell within the DRS measurement timing window, where the monitoring for the second DRS is based on the received first DRS 1024.

In some cases, the second DRS includes a beam identifier, a cell identifier corresponding to the second cell, or both. In some cases, the first DRS 1024 includes an indication of an availability of one or more candidate cells operating in the second frequency band. In some cases, the third cell and the second cell operate in a same shared channel of the second frequency band. In some cases, the second cell operates over a first channel of the second frequency band and the third cell operates over a second channel of the second frequency band. In some cases, the second cell and the third cell are associated with a same base station. In some cases, the first DRS 1024 includes a timing reference for the DRS measurement timing window (e.g., an offset between the transmitted DRS and the beginning of the DRS measurement timing window or reference subframe), an indication of an availability of one or more candidate cells operating in the second frequency band, or both. In some cases, the first cell and the second cell are associated with respective antenna arrays of a same base station. In some cases, the first cell is associated with a first base station and the second cell is associated with a different base station. In some cases, the second cell is identified from a list of candidate cells, the list of candidate cells received via the first radio. In some cases, the second cell is associated with a base station and the third cell is associated with a different base station.

Power manager 1035 may activate the second radio based on the configuration 1018 for the DRS measurement timing window (e.g., and/or the received first DRS 1024), where the second radio is associated with communication via the second frequency band.

Figure 11:
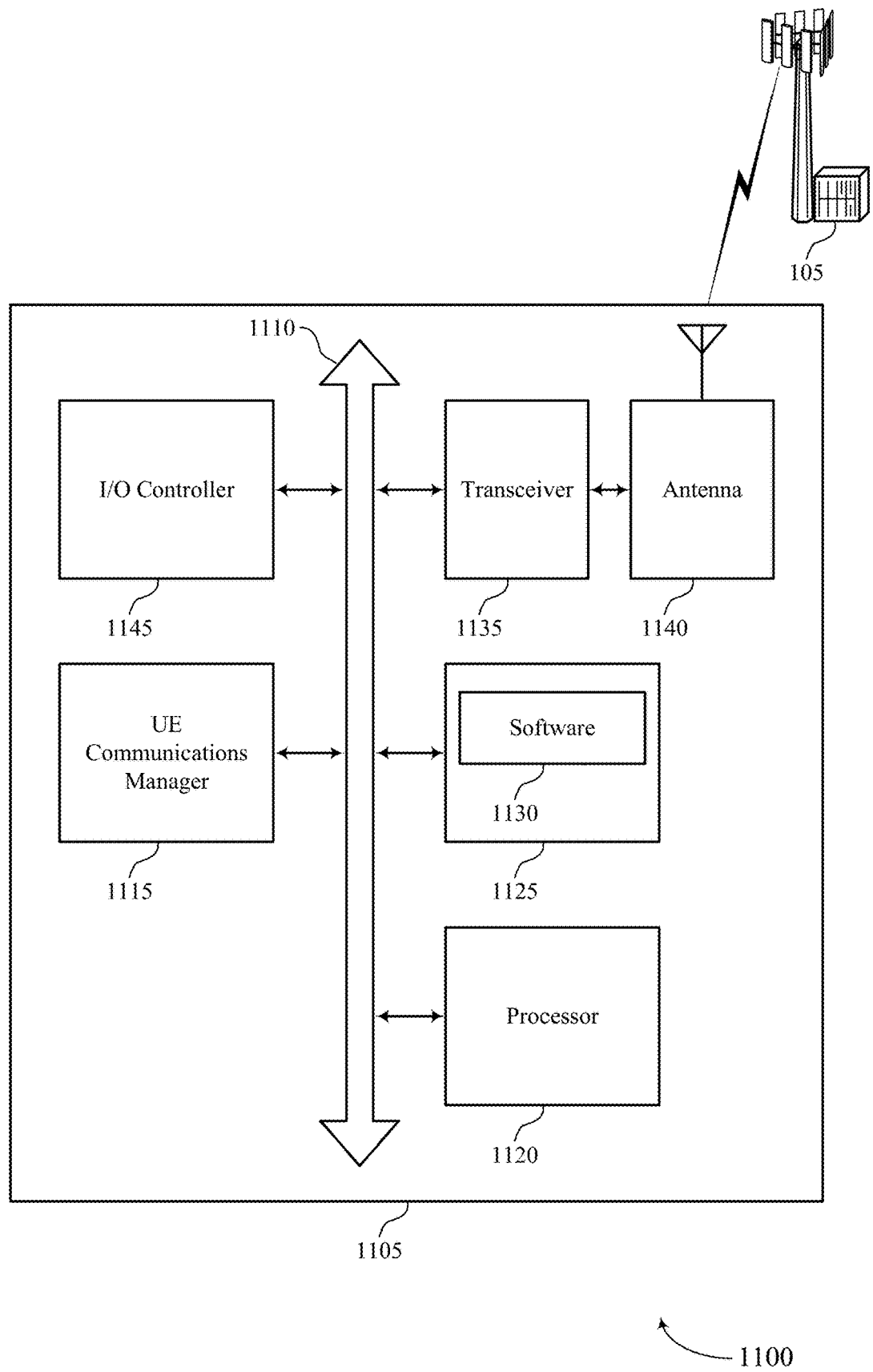
FIG. 11 illustrates a block diagram of a system including a UE that supports discovery procedures for multi-band operation in accordance with aspects of the present disclosure.

FIG. 11 shows a diagram of a system 1100 including a device 1105 that supports discovery procedures for multi-band operation in accordance with aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting discovery procedures for multi-band operation).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support discovery procedures for multi-band operation. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
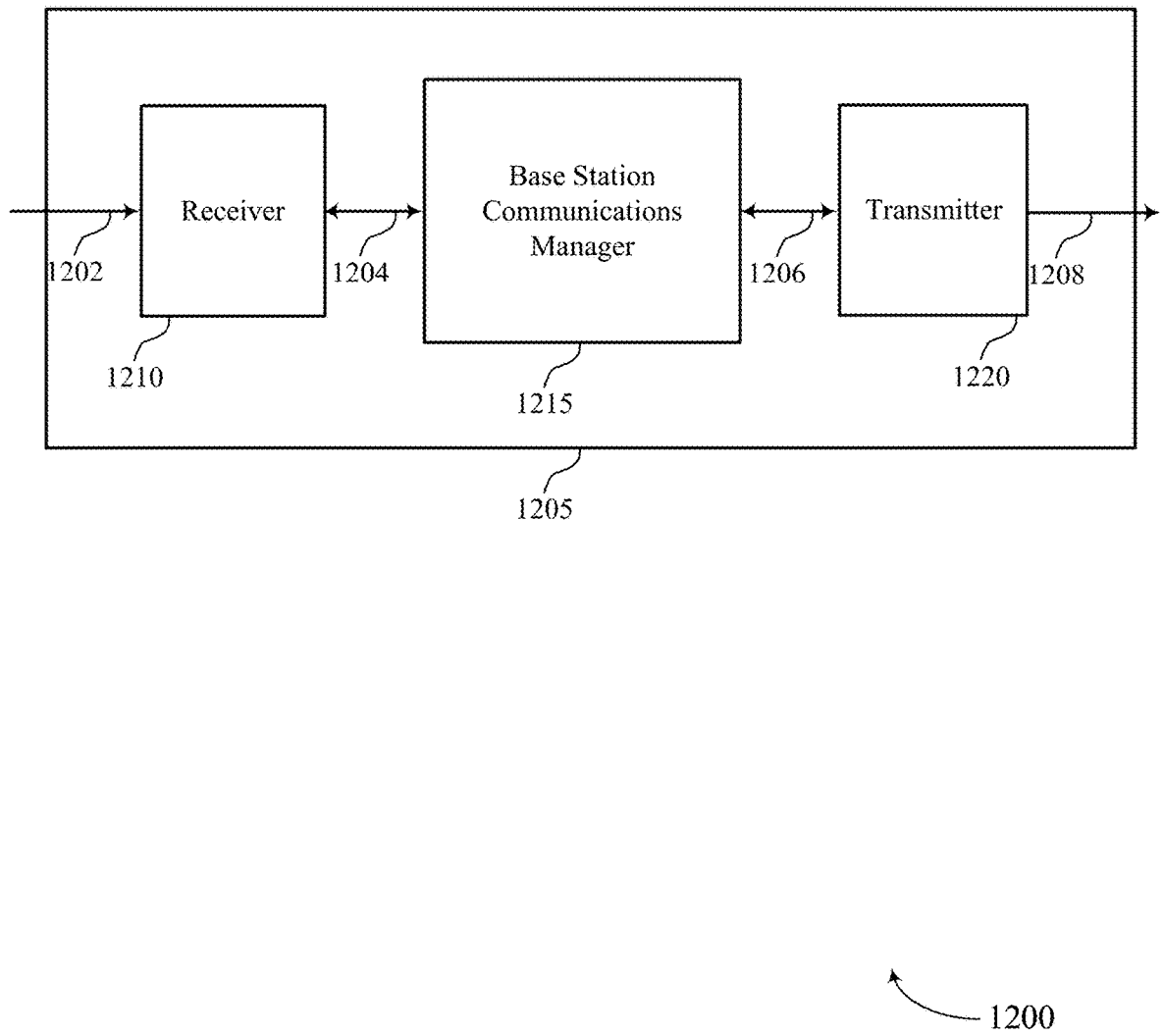
FIGS. 12 through 14 show block diagrams of a device that supports discovery procedures for multi-band operation in accordance with aspects of the present disclosure.

FIG. 12 shows a block diagram 1200 of a wireless device 1205 that supports discovery procedures for multi-band operation in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive signals 1202 including information such as packets, user data, or control information associated with various information channels (e.g., control channels, data channels, and information related to discovery procedures for multi-band operation, etc.). Information 1204 may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may receive the information 1204 from the receiver 1210 and identify a configuration for a DMTC window for a first cell associated with a first frequency band. Base station communications manager 1215 may identify a DRS offset for a second cell associated with a second frequency band, the second frequency band including higher frequencies than the first frequency band. Base station communications manager 1215 may transmit a second DRS associated with the second cell based on the DRS measurement timing window for the first cell and the DRS offset for the second cell. Base station communications manager 1215 may transmit information 1206 corresponding to the second DRS to the transmitter 1220 for transmission of the second DRS.

Transmitter 1220 may transmit signals 1208 generated by other components of the device, such as the base station communications manager 1215. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
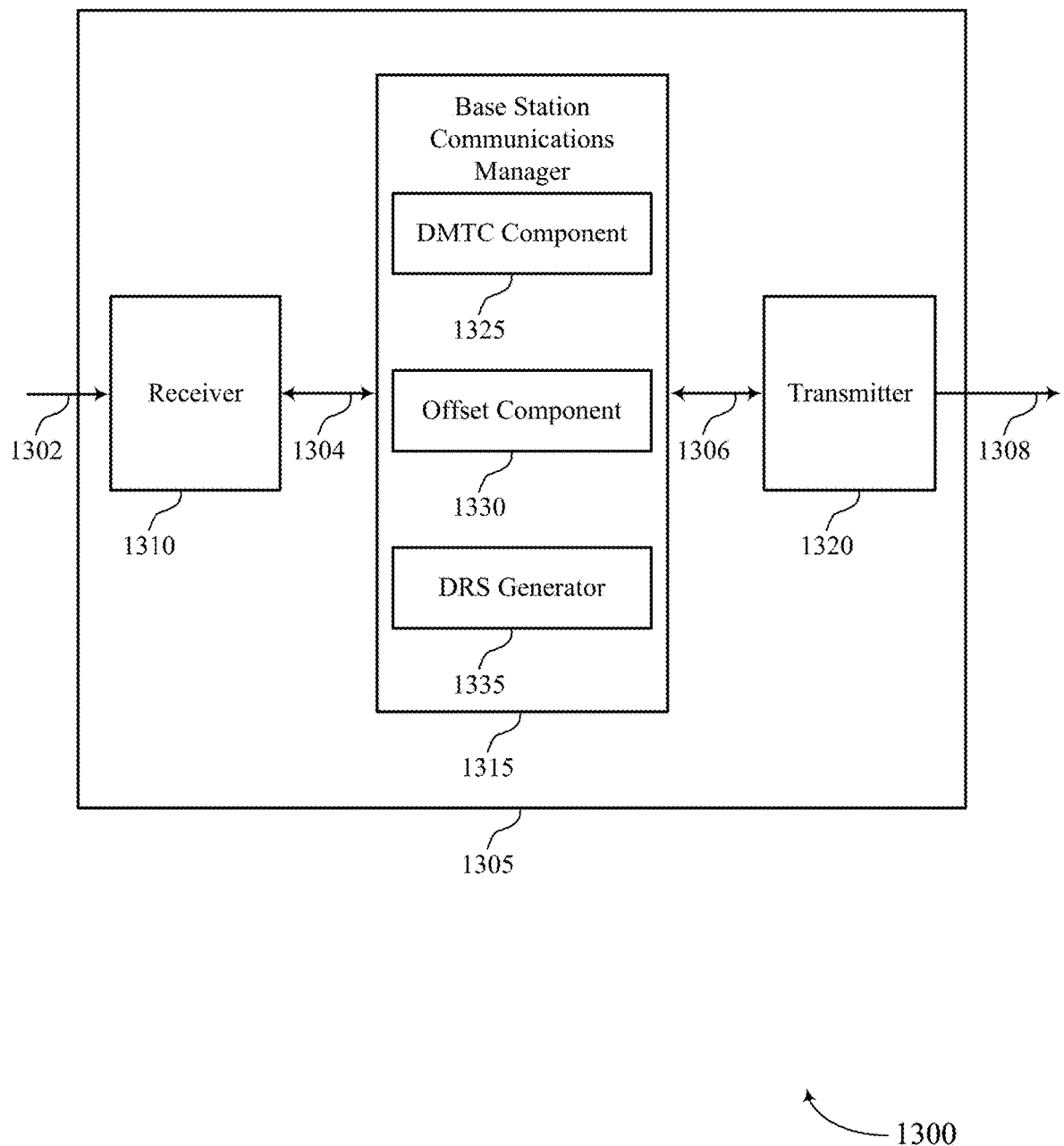

FIG. 13 shows a block diagram 1300 of a wireless device 1305 that supports discovery procedures for multi-band operation in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive signals 1302 including information such as packets, user data, or control information associated with various information channels (e.g., control channels, data channels, and information related to discovery procedures for multi-band operation, etc.). Information 1304 may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include DMTC component 1325, offset component 1330, DRS detector 1340, and DRS generator 1335. Base station communications manager 1315 may receive information 1304 from the receiver 1310.

DMTC component 1325 may identify a configuration for a DMTC window for a first cell associated with a first frequency band. Offset component 1330 may identify a DRS offset for a second cell associated with a second frequency band, the second frequency band including higher frequencies than the first frequency band.

DRS generator 1335 may transmit a second DRS associated with the second cell based on the DRS measurement timing window for the first cell and the DRS offset for the second cell. In some cases, the first cell is associated with a base station and the second cell is associated with a different base station. In some cases, the second DRS includes a beam index corresponding to a transmit beam of the different base station, a cell identifier corresponding to the second cell, or both. In some cases, the base station communications manager 1315 transmits information 1306 corresponding to the second DRS to the transmitter 1320 for transmission of a signal including the second DRS.

Transmitter 1320 may transmit signals 1308 generated by other components of the device, such as the base station communications manager 1315. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
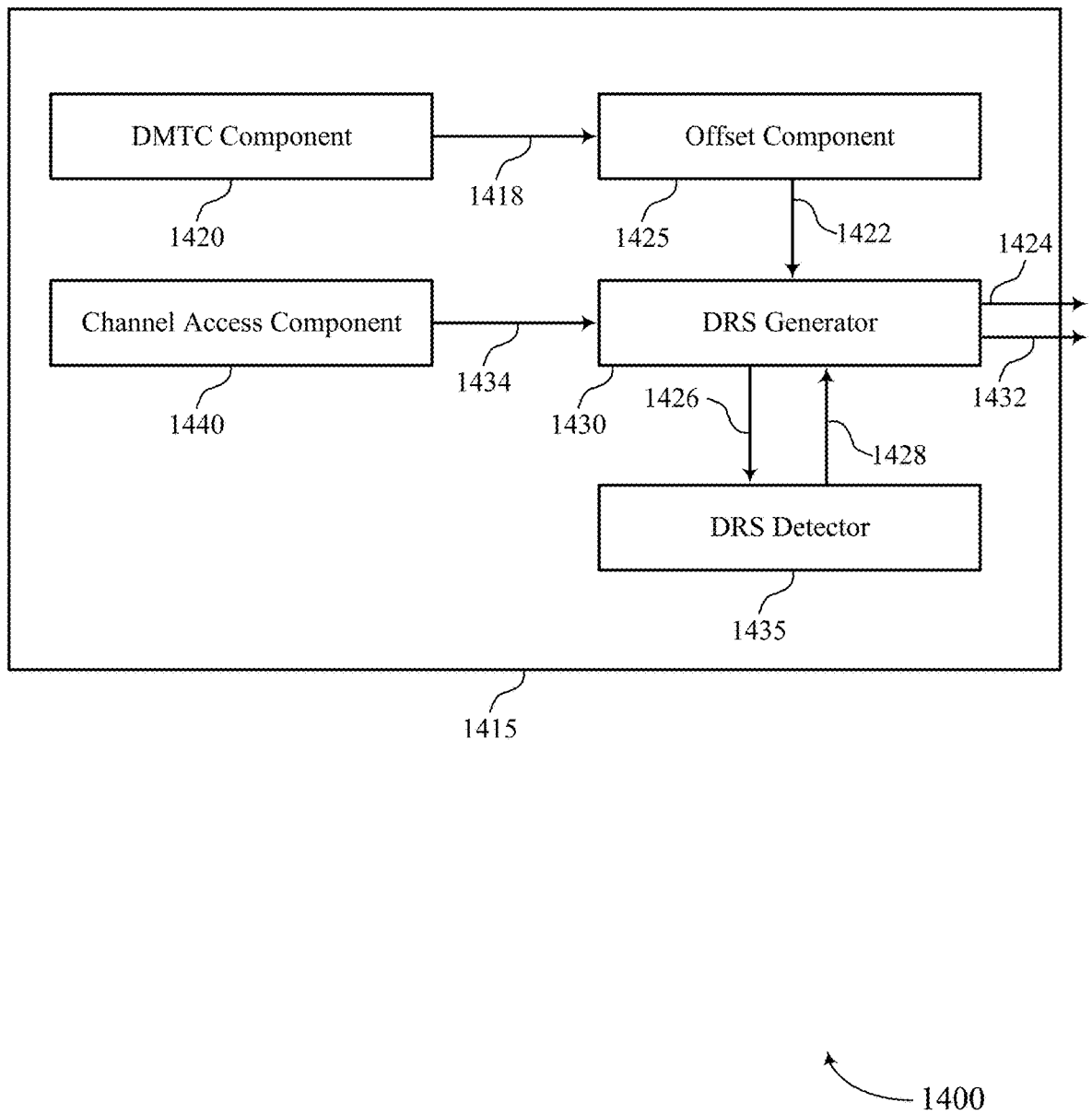

FIG. 14 shows a block diagram 1400 of a base station communications manager 1415 that supports discovery procedures for multi-band operation in accordance with aspects of the present disclosure. The base station communications manager 1415 may be an example of aspects of a base station communications manager 1515 described with reference to FIGS. 12, 13, and 15. The base station communications manager 1415 may include DMTC component 1420, offset component 1425, DRS detector 1435, DRS generator 1430, and clear channel assessment (carrier aggregation (CA)) component 1445. Each of these modules may communicate, directly or indirectly, with one another (e.g., via one or more buses).

DMTC component 1420 may identify a configuration 1418 for a DMTC window for a first cell associated with a first frequency band. Offset component 1425 may identify a DRS offset 1422 for a second cell associated with a second frequency band relative to the configuration 1418 for the DMTC window for the first cell, the second frequency band including higher frequencies than the first frequency band.

DRS generator 1430 may transmit a first DRS 1424 based on the DRS measurement timing window. In some cases, the first DRS 1424 includes a timing reference for the DRS measurement timing window, an indication of an availability of one or more candidate cells operating in the second frequency band, or both. For example, the timing reference may indicate how many subframes the transmitted first DRS 1424 is offset from the reference subframe. DRS detector 1435 may detect 1426 a transmission of the first DRS associated with the first cell within the DRS measurement timing window. In some cases, responsive to notification 1428 of detection 1426 of the first DRS by the DRS detector 1435, the DRS generator 1430 may transmit a second DRS 1432 associated with the second cell based on the DRS measurement timing window for the first cell and the DRS offset 1422 In some cases, the first cell is associated with a base station and the second cell is associated with a different base station. In some cases, the second DRS 1432 includes a beam index corresponding to a transmit beam of the different base station, a cell identifier corresponding to the second cell, or both.

Channel access component 1440 may determine an availability of a first frequency channel of the first frequency band based on a first channel access procedure and may forward a notification 1434 of the availability of the first channel of the first frequency band to DRS generator 1430. In response to the notification 1434, the DRS generator 1430 may transmit the first DRS 1424 on the first channel access procedure.

Figure 15:
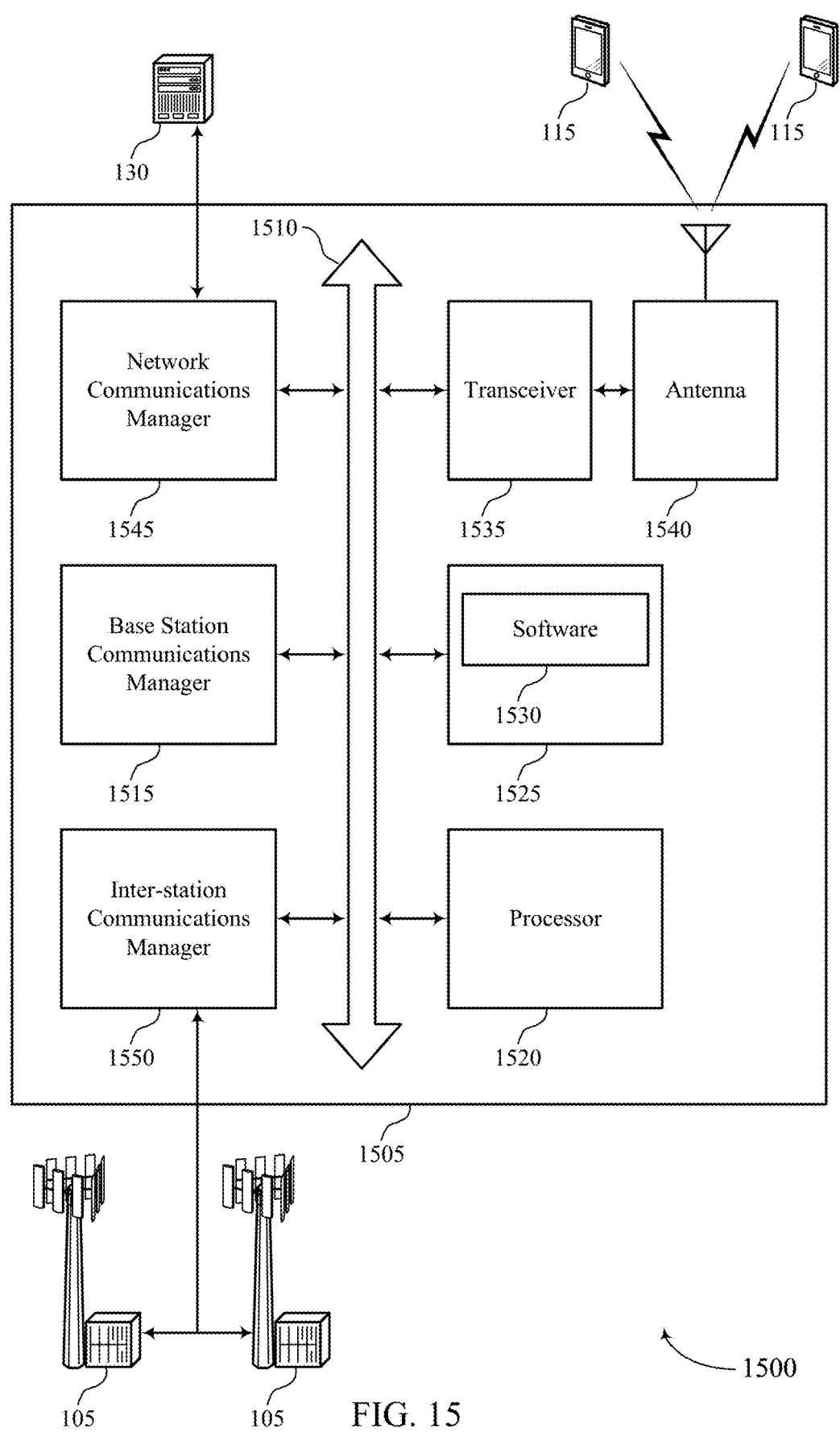
FIG. 15 illustrates a block diagram of a system including a base station that supports discovery procedures for multi-band operation in accordance with aspects of the present disclosure.

FIG. 15 shows a diagram of a system 1500 including a device 1505 that supports discovery procedures for multi-band operation in accordance with aspects of the present disclosure. Device 1505 may be an example of or include the components of base station 105 as described herein, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting discovery procedures for multi-band operation).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support discovery procedures for multi-band operation. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described herein. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115. Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
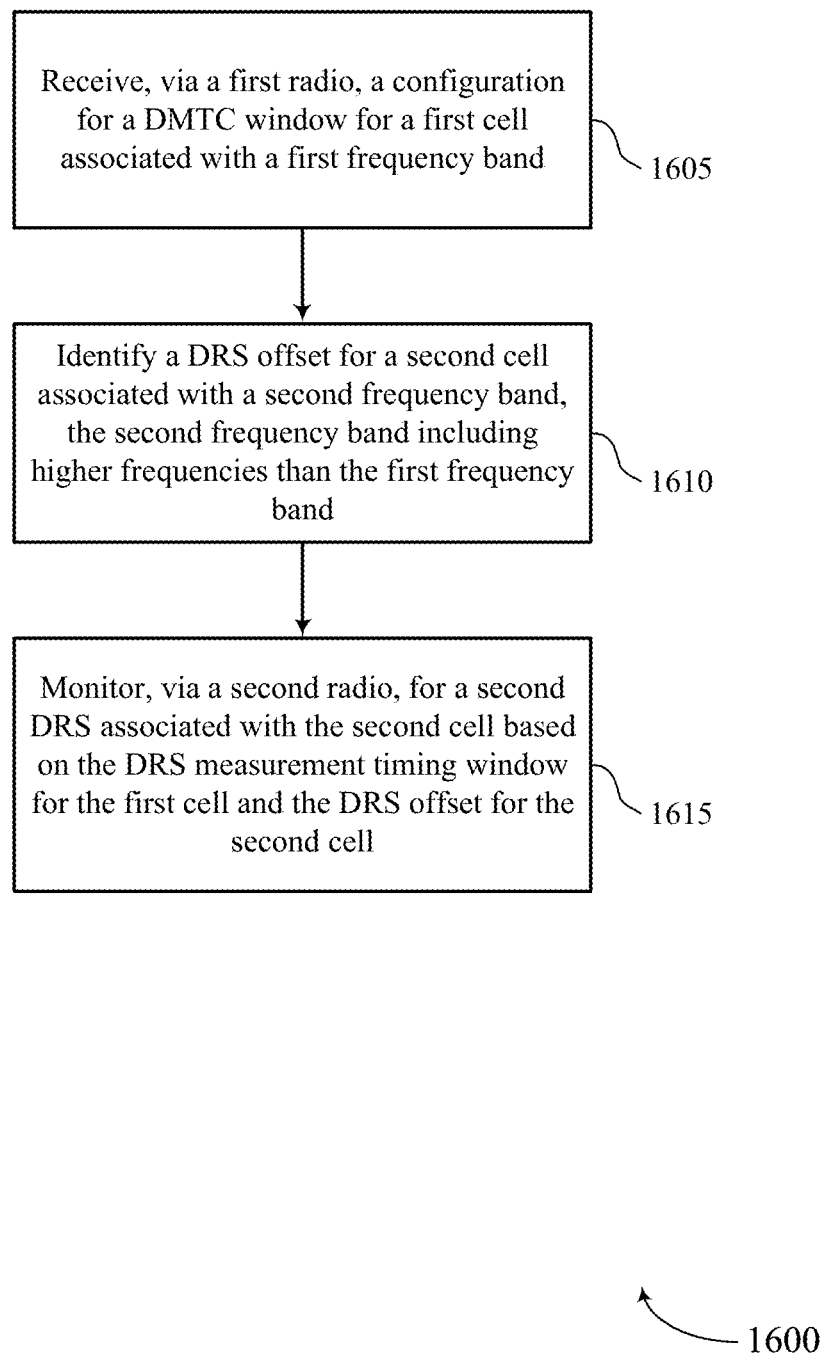
FIGS. 16 through 19 illustrate methods for discovery procedures for multi-band operation in accordance with aspects of the present disclosure.

FIG. 16 shows a flowchart illustrating a method 1600 for discovery procedures for multi-band operation in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At block 1605 the UE 115 may receive, via a first radio, a configuration for a DMTC window for a first cell associated with a first frequency band. The operations of block 1605 may be performed according to the methods described herein. In certain examples, aspects of the operations of block 1605 may be performed by a DMTC component as described with reference to FIGS. 8 through 11. The configuration for the DMTC for the first cell may be received in at least one of: system information, or radio resource control (RRC) signaling, or a combination thereof. The receiving may include identifying time-frequency resources over which the system information or RRC signaling is received, demodulating transmission over those time-frequency resources, decoding the demodulated transmission to obtain the bits that indicate the configuration for the DMTC window.

At block 1610 the UE 115 may identify a DRS offset for a second cell associated with a second frequency band, the second frequency band comprising higher frequencies than the first frequency band. The operations of block 1610 may be performed according to the methods described herein. In certain examples, aspects of the operations of block 1610 may be performed by a offset component as described with reference to FIGS. 8 through 11. The identification of the DRS offset for a second cell associated with the second frequency band may be based on the configuration for the DMTC window. Accordingly, the bits obtain via decoding the demodulated transmission may indicate the DRS offset for the second cell.

At block 1615 the UE 115 may monitor, via a second radio, for a second DRS associated with the second cell based at least in part on the DRS measurement timing window for the first cell and the DRS offset for the second cell. The operations of block 1615 may be performed according to the methods described herein. In certain examples, aspects of the operations of block 1615 may be performed by a DRS component as described with reference to FIGS. 8 through 11. The monitoring may include tuning the second radio to the second frequency, demodulating transmission over time-frequency resource based on the offset, and decoding the demodulated transmission to obtain the bits that indicate second DRS.

Figure 17:
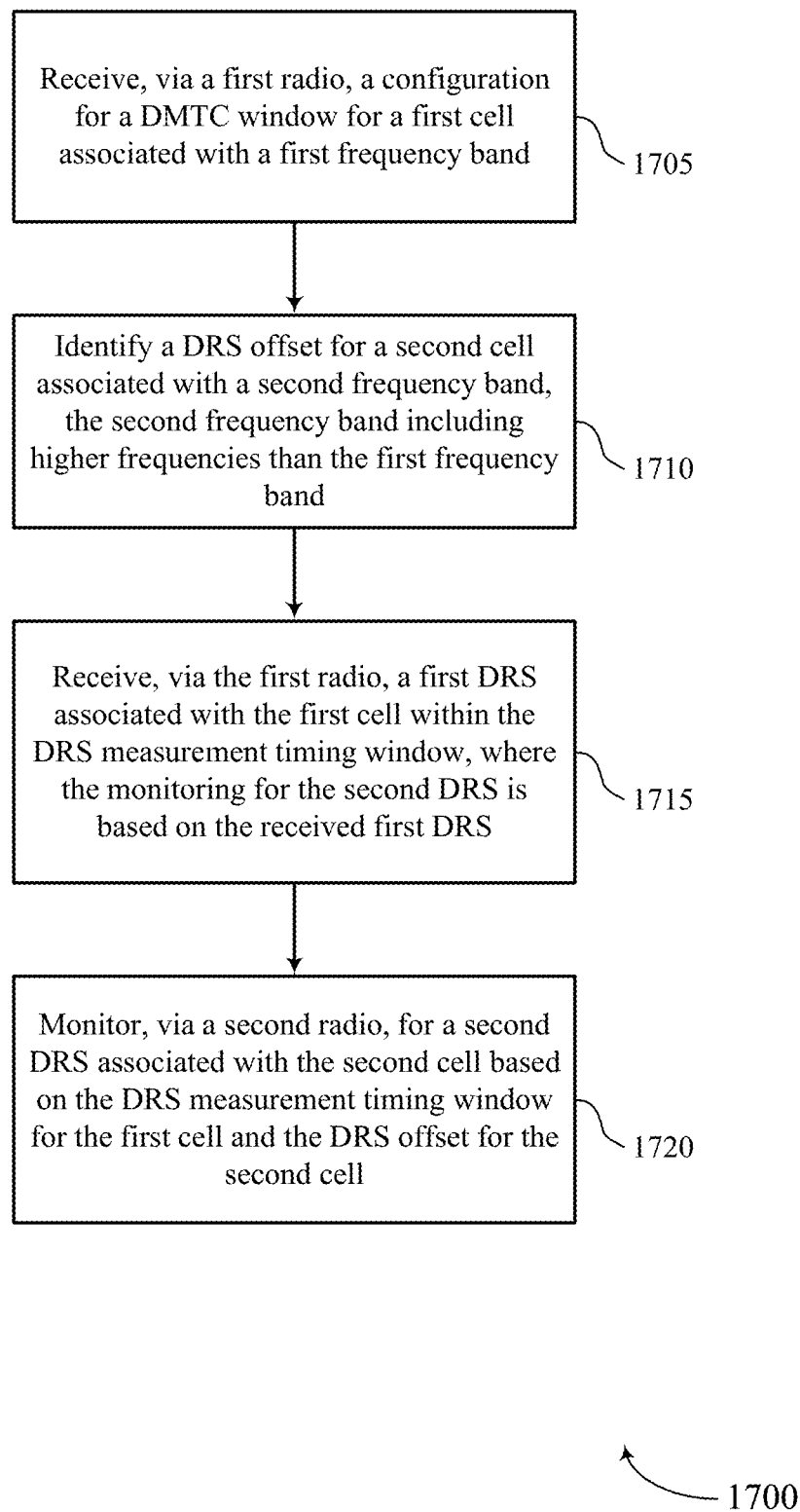

FIG. 17 shows a flowchart illustrating a method 1700 for discovery procedures for multi-band operation in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described herein using special-purpose hardware.

At block 1705 the UE 115 may receive, via a first radio, a configuration for a DMTC window for a first cell associated with a first frequency band. The operations of block 1705 may be performed according to the methods described herein. In certain examples, aspects of the operations of block 1705 may be performed by a DMTC component as described with reference to FIGS. 8 through 11. The configuration for the DMTC for the first cell may be received in at least one of: system information, or radio resource control (RRC) signaling, or a combination thereof. The receiving may include identifying time-frequency resources over which the system information or RRC signaling is received, demodulating transmission over those time-frequency resources, decoding the demodulated transmission to obtain the bits that indicate the configuration for the DMTC window.

At block 1710 the UE 115 may identify a DRS offset for a second cell associated with a second frequency band, the second frequency band comprising higher frequencies than the first frequency band. The operations of block 1710 may be performed according to the methods described herein. In certain examples, aspects of the operations of block 1710 may be performed by a offset component as described with reference to FIGS. 8 through 11. The identification of the DRS offset for a second cell associated with the second frequency band may be based on the configuration for the DMTC window. Accordingly, the bits obtain via decoding the demodulated transmission may indicate the DRS offset for the second cell.

At block 1715 the UE 115 may receive, via the first radio, a first DRS associated with the first cell within the DRS measurement timing window, wherein the monitoring for the second DRS is based at least in part on the received first DRS. The operations of block 1715 may be performed according to the methods described herein. In certain examples, aspects of the operations of block 1715 may be performed by a DRS component as described with reference to FIGS. 8 through 11. The receiving may include tuning the first radio to the first frequency band, demodulating a received transmission over a time frequency resource based on the configuration for the DMTC window, and decoding the demodulated transmission to obtain the bits that indicate the first DRS.

At block 1720 the UE 115 may monitor, via a second radio, for a second DRS associated with the second cell based at least in part on the DRS measurement timing window for the first cell and the DRS offset for the second cell. The operations of block 1720 may be performed according to the methods described herein. In certain examples, aspects of the operations of block 1720 may be performed by a DRS component as described with reference to FIGS. 8 through 11. The monitoring may include tuning the second radio to the second frequency band, demodulating a received transmission over the time-frequency resource according to the second frequency band and the offset based on the first DRS, and decoding the demodulated transmission to obtain the bits that indicate the second DRS.

Figure 18:
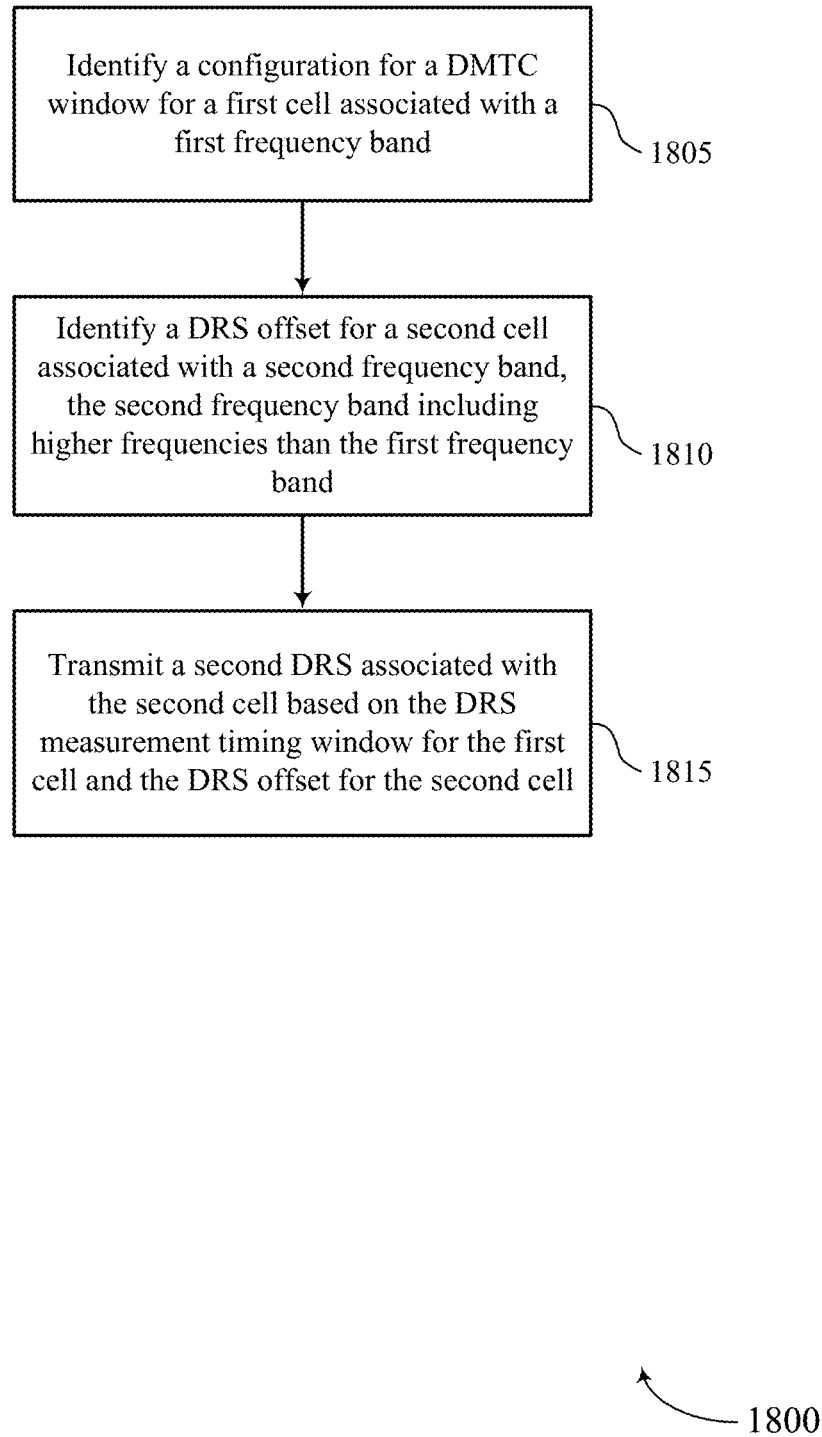

FIG. 18 shows a flowchart illustrating a method 1800 for discovery procedures for multi-band operation in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described herein using special-purpose hardware.

At block 1805 the base station 105 may identify a configuration for a DMTC timing window for a first cell associated with a first frequency band. The operations of block 1805 may be performed according to the methods described herein. In certain examples, aspects of the operations of block 1805 may be performed by a DMTC component as described with reference to FIGS. 12 through 15. The identification may be based on the first frequency band, a pre-configuration, etc.

At block 1810 the base station 105 may identify a DRS offset for a second cell associated with a second frequency band, the second frequency band comprising higher frequencies than the first frequency band. The operations of block 1810 may be performed according to the methods described herein. In certain examples, aspects of the operations of block 1810 may be performed by an offset component as described with reference to FIGS. 12 through 15. The offset may be identified based the first or the second frequency band, an associated cell, or a subcarrier spacing for a given cell, for example.

At block 1815 the base station 105 may transmit a second DRS associated with the second cell based at least in part on the DRS measurement timing window for the first cell and the DRS offset for the second cell. The operations of block 1815 may be performed according to the methods described herein. In certain examples, aspects of the operations of block 1815 may be performed by a DRS generator as described with reference to FIGS. 12 through 15. The transmitting may include encoding the bits that indicate the second DRS, modulating the encoded bits, and transmitting the second DRS using a radio system.

Figure 19:
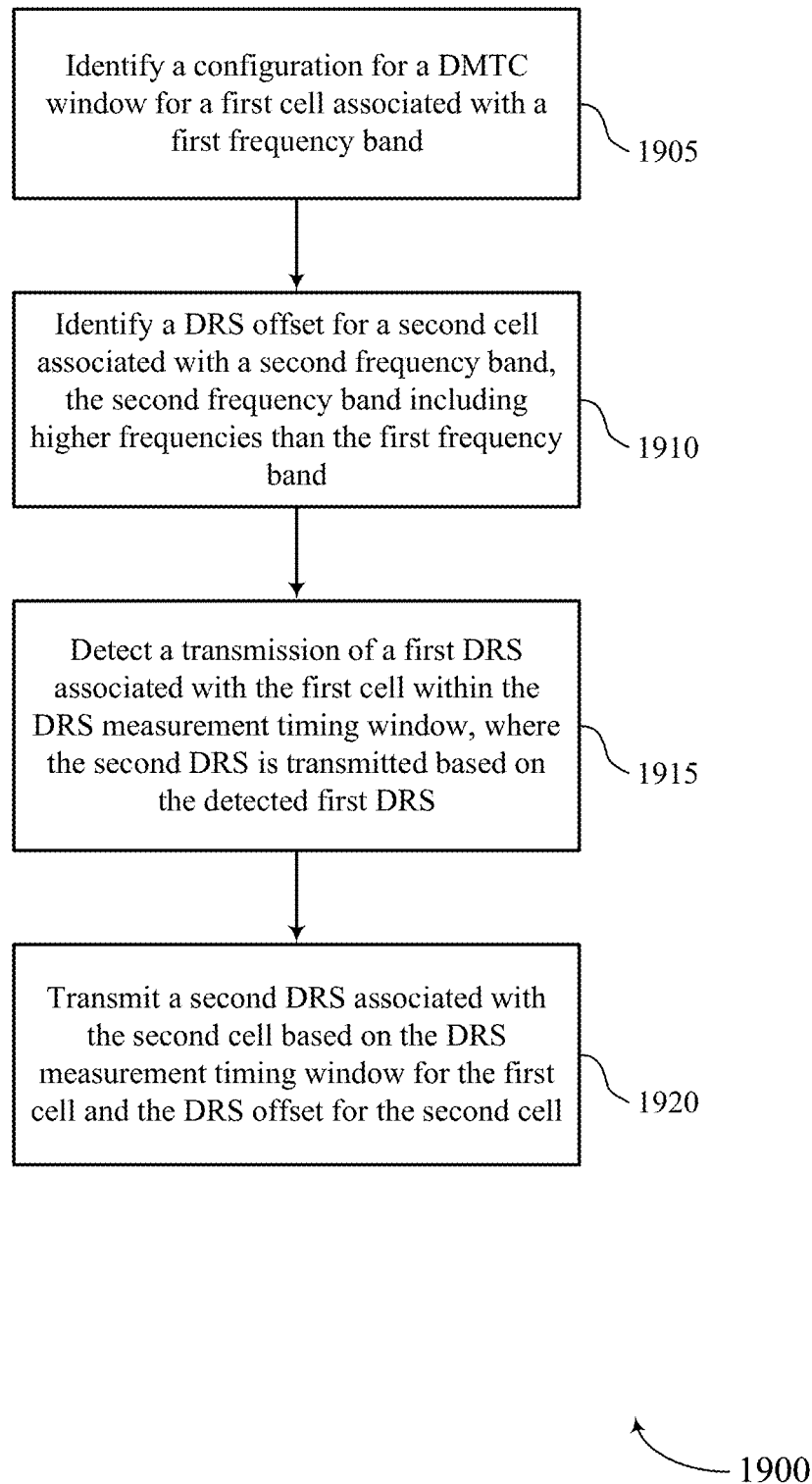

FIG. 19 shows a flowchart illustrating a method 1900 for discovery procedures for multi-band operation in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described herein using special-purpose hardware.

At block 1905 the base station 105 may identify a configuration for a DMTC window for a first cell associated with a first frequency band. The operations of block 1905 may be performed according to the methods described herein. In certain examples, aspects of the operations of block 1905 may be performed by a DMTC component as described with reference to FIGS. 12 through 15. The identification may be based on the first frequency band, a pre-configuration, etc.

At block 1910 the base station 105 may identify a DRS offset for a second cell associated with a second frequency band, the second frequency band comprising higher frequencies than the first frequency band. The operations of block 1910 may be performed according to the methods described herein. In certain examples, aspects of the operations of block 1910 may be performed by an offset component as described with reference to FIGS. 12 through 15. The offset may be identified based the first or the second frequency band, an associated cell, or a subcarrier spacing for a given cell, for example.

At block 1915 the base station 105 may detect a transmission of a first DRS associated with the first cell within the DRS measurement timing window, wherein the second DRS is transmitted based at least in part on the detected first DRS. The operations of block 1915 may be performed according to the methods described herein. In certain examples, aspects of the operations of block 1915 may be performed by a DRS detector as described with reference to FIGS. 12 through 15. The detection of the first DRS may be based on backhaul signaling, OTA synchronization, etc.

At block 1920 the base station 105 may transmit a second DRS associated with the second cell based at least in part on the DRS measurement timing window for the first cell and the DRS offset for the second cell. The operations of block 1920 may be performed according to the methods described herein. In certain examples, aspects of the operations of block 1920 may be performed by a DRS generator as described with reference to FIGS. 12 through 15. The transmitting may include encoding the bits that indicate the second DRS, modulating the encoded bits, and transmitting the second DRS using a radio system.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, via a first radio, a configuration for a discovery reference signal (DRS) measurement timing window for a first cell associated with a first frequency band;
    monitoring, via the first radio, for receipt of a first DRS associated with the first cell within the DRS measurement timing window based at least in part on the configuration, wherein the first DRS is monitored subject to a first channel access procedure in the first cell;
    identifying a DRS timing offset for a second cell associated with a second frequency band, the second frequency band comprising higher frequencies than the first frequency band; and
    receiving, via a second radio, a second DRS associated with the second cell based at least in part on the DRS measurement timing window for the first cell during which the first DRS is monitored for and the DRS timing offset for the second cell, wherein the second DRS is received subject to a second channel access procedure in the second cell.

2. The method of claim 1, further comprising:
    receiving, via the first radio, the first DRS associated with the first cell within the DRS measurement timing window, wherein the DRS timing offset for the second DRS associated with the second cell is referenced to the first DRS.

3. The method of claim 2, wherein the first DRS comprises an indication of an availability of one or more candidate cells operating in the second frequency band.

4. The method of claim 1, further comprising:
    determining a location of the UE based at least in part on a reference signal received via the first radio, wherein the receiving of the second DRS is based at least in part on the determined location.

5. The method of claim 1, further comprising:
receiving, via the first radio, the first DRS associated with the first cell within the DRS measurement timing window, wherein the first DRS includes an indication of a reference subframe of the DRS measurement timing window.

6. The method of claim 1, wherein the DRS timing offset for the second cell is determined based on a reference subframe of the DRS measurement timing window.

7. The method of claim 1, further comprising:
identifying a second DRS timing offset for a third cell operating in the second frequency band; and
monitoring, via the second radio, for a third DRS associated with the third cell based at least in part on the DRS measurement timing window for the first cell and the second DRS timing offset for the third cell.

8. The method of claim 7, wherein the third cell and the second cell operate in the second frequency band.

9. The method of claim 7, wherein the second cell operates over a first channel of the second frequency band and the third cell operates over a second channel of the second frequency band.

10. The method of claim 7, wherein the second cell and the third cell are associated with a same base station.

11. The method of claim 7, wherein the second cell is associated with a base station and the third cell is associated with a different base station.

12. The method of claim 1, wherein the first cell and the second cell are associated with respective antenna arrays of a same base station.

13. The method of claim 1, wherein the first cell is associated with a first base station and the second cell is associated with a different base station.

14. The method of claim 1, further comprising:
activating the second radio based on the configuration for the DRS measurement timing window, wherein the second radio is associated with communication via the second frequency band.

15. The method of claim 1, wherein the second cell is identified from a list of candidate cells, the list of candidate cells received via the first radio.

16. The method of claim 1, wherein the second DRS comprises a beam identifier, a cell identifier corresponding to the second cell, or both.

17. The method of claim 16, further comprising:
reporting the cell identifier to a base station associated with the first cell; and
associating with the second cell based at least in part on the beam identifier.

18. The method of claim 1, wherein the first frequency band is associated with a first path loss and the second frequency band is associated with a second path loss greater than the first path loss.

19. A method for wireless communication, comprising:
identifying a configuration for a discovery reference signal (DRS) measurement timing window for a first cell associated with a first frequency band;
monitoring for transmission of a first DRS associated with the first cell within the DRS measurement timing window based at least in part on the configuration, wherein the first DRS is transmitted subject to a first channel access procedure in the first cell;
identifying a DRS timing offset for a second cell associated with a second frequency band, the second frequency band comprising higher frequencies than the first frequency band; and
transmitting a second DRS associated with the second cell based at least in part on the DRS measurement timing window for the first cell and the DRS timing offset for the second cell, wherein the second DRS is transmitted subject to a second channel access procedure in the second cell.

20. The method of claim 19, further comprising:
detecting the transmission of the first DRS associated with the first cell within the DRS measurement timing window, wherein the second DRS is transmitted based at least in part on the detected first DRS.

21. The method of claim 19, further comprising:
transmitting the first DRS, wherein the first DRS comprises a timing reference for the DRS timing offset, an indication of an availability of one or more candidate cells operating in the second frequency band, or both.

22. The method of claim 19, further comprising:
determining an availability of a first frequency channel of the first frequency band based at least in part on the first channel access procedure; and
transmitting the first DRS based at least in part on the first channel access procedure.

23. The method of claim 19, wherein the first cell is associated with a base station and the second cell is associated with a different base station.

24. The method of claim 19, wherein the second DRS comprises a beam identifier, a cell identifier corresponding to the second cell, or both.

25. An apparatus for wireless communication at a user equipment (UE), comprising:
a processor;
memory in electronic communication with the processor; and
instructions stored in the memory and operable, when executed by the processor, to cause the apparatus to:
receive, via a first radio, a configuration for a discovery reference signal (DRS) measurement timing window for a first cell associated with a first frequency band;
monitor, via the first radio, for receipt of a first DRS associated with the first cell within the DRS measurement timing window based at least in part on the configuration, wherein the first DRS is monitored subject to a first channel access procedure in the first cell;
identify a DRS timing offset for a second cell associated with a second frequency band, the second frequency band comprising higher frequencies than the first frequency band; and
receive, via a second radio, a second DRS associated with the second cell based at least in part on the DRS measurement timing window for the first cell during which the first DRS is monitored for and the DRS timing offset for the second cell, wherein the second DRS is received subject to a second channel access procedure in the second cell.

26. The apparatus of claim 25, wherein the instructions are further 2 executable by the processor to:
receive, via the first radio, the first DRS associated with the first cell within the DRS measurement timing window, wherein the DRS timing offset for the second cell is referenced to the first DRS.

27. The apparatus of claim 25, wherein the first DRS comprises an indication of an availability of one or more candidate cells operating in the second frequency band.

28. An apparatus for wireless communication, comprising:
- a processor;
- memory in electronic communication with the processor; and
- instructions stored in the memory and operable, when executed by the processor, to cause the apparatus to:
  - identify a configuration for a discovery reference signal (DRS) measurement timing window for a first cell associated with a first frequency band;
  - monitoring for transmission of a first DRS associated with the first cell within the DRS measurement timing window based at least in part on the configuration, wherein the first DRS is transmitted subject to a first channel access procedure in the first cell;
  - identify a DRS timing offset for a second cell associated with a second frequency band, the second frequency band comprising higher frequencies than the first frequency band; and
  - transmit a second DRS associated with the second cell based at least in part on the DRS measurement timing window for the first cell and the DRS timing offset for the second cell, wherein the second DRS is transmitted subject to a second channel access procedure in the second cell.

29. The apparatus of claim 28, wherein the instructions are further executable by the processor to:
- detect the transmission of the first DRS associated with the first cell within the DRS measurement timing window, wherein the second DRS is transmitted based at least in part on the detected first DRS.

30. The apparatus of claim 28, wherein the instructions are further executable by the processor to:
- transmit the first DRS, wherein the first DRS comprises a timing reference for the DRS timing offset, an indication of an availability of one or more candidate cells operating in the second frequency band, or both.

\* \* \* \* \*